Aug. 2, 1949.   J. S. BURGE ET AL   2,477,859
APPARATUS FOR MAKING CONNECTOR ASSEMBLIES
Filed Nov. 4, 1947   34 Sheets-Sheet 3
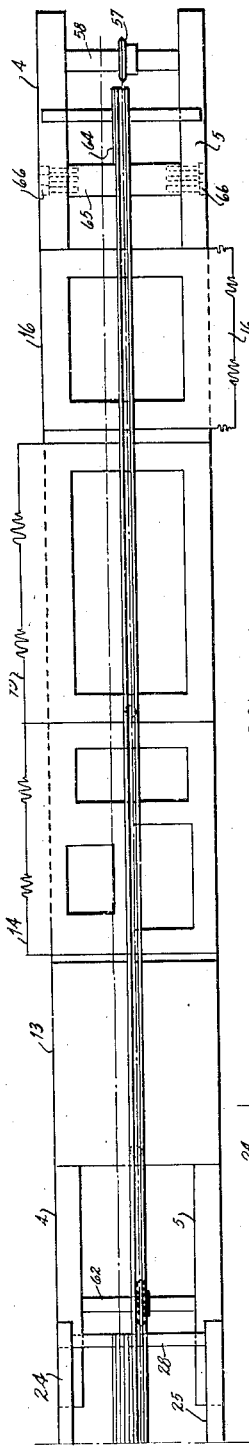
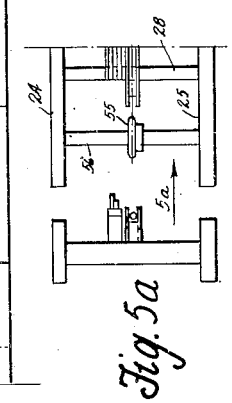
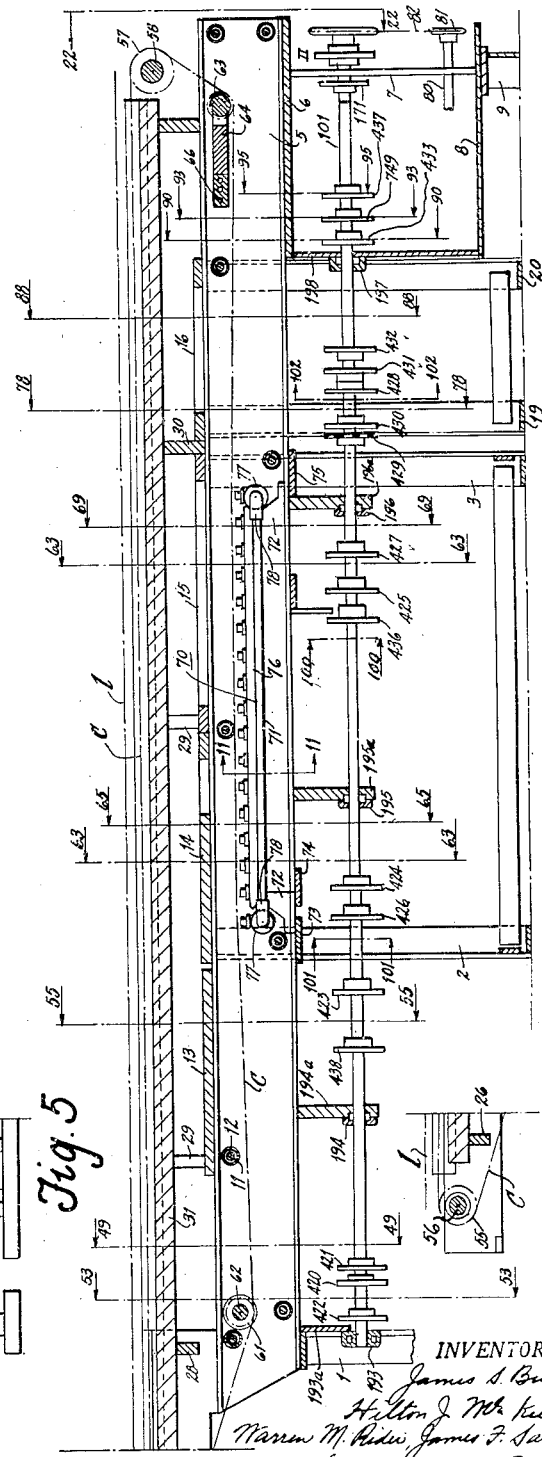

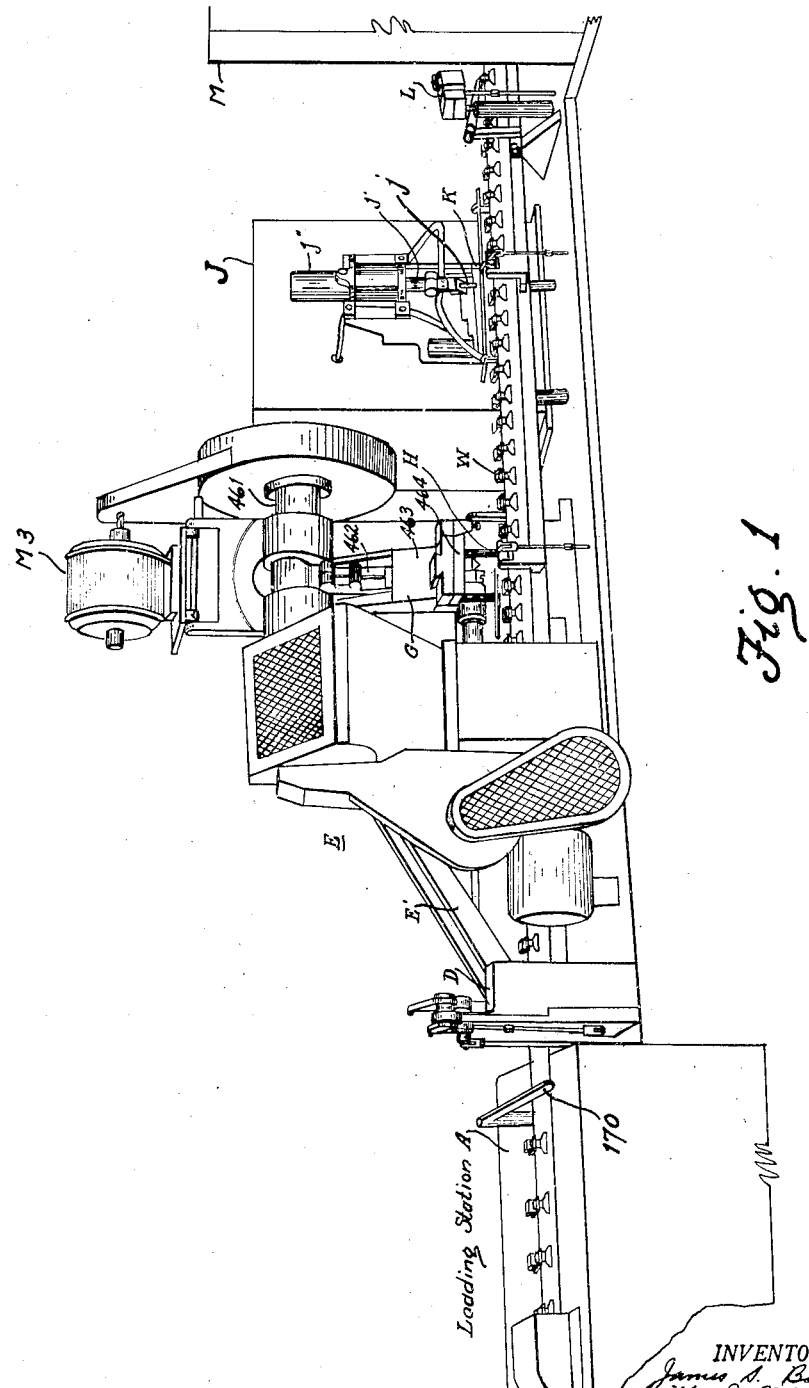

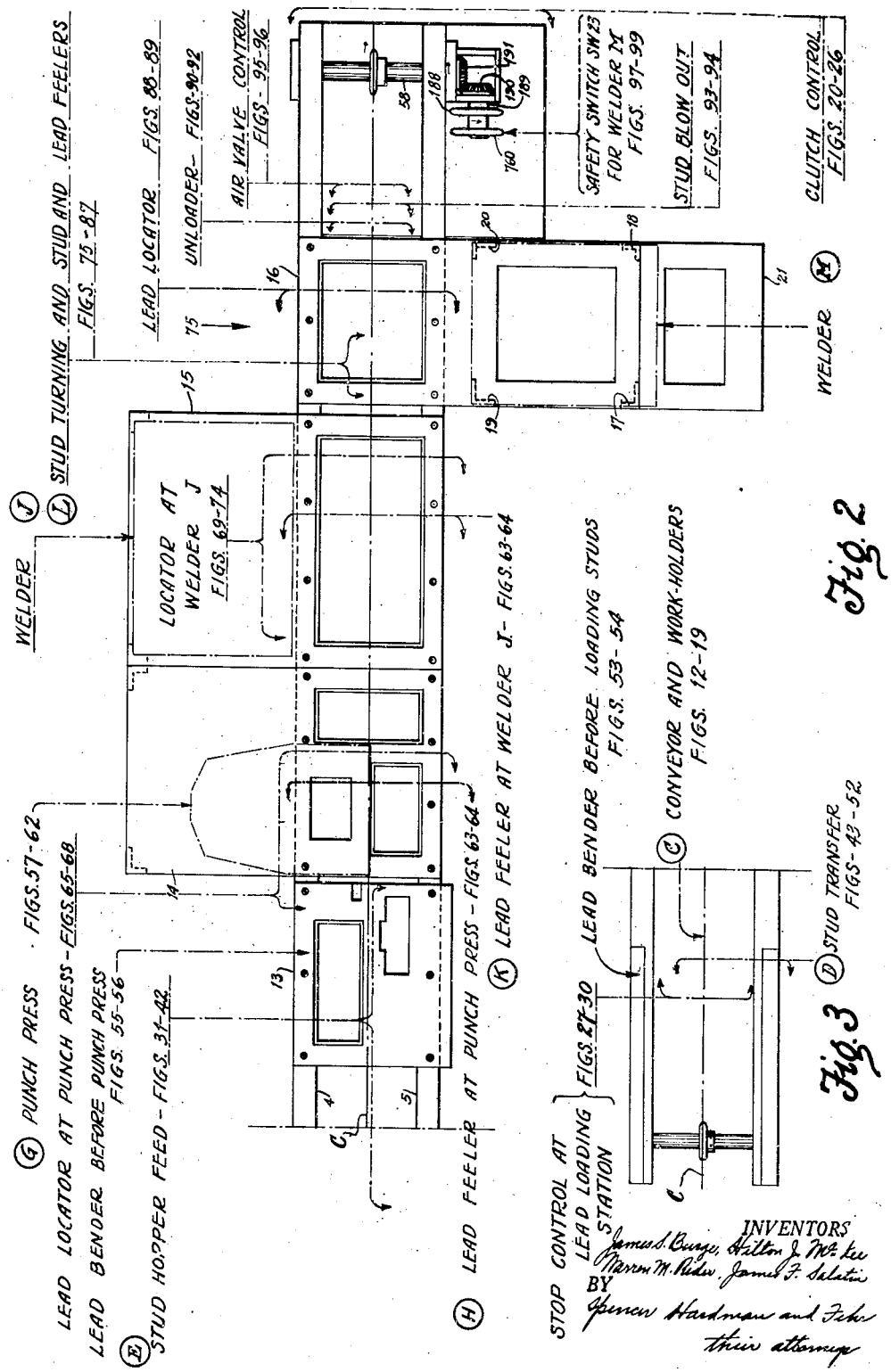

Aug. 2, 1949. J. S. BURGE ET AL 2,477,859
APPARATUS FOR MAKING CONNECTOR ASSEMBLIES
Filed Nov. 4, 1947 34 Sheets-Sheet 4
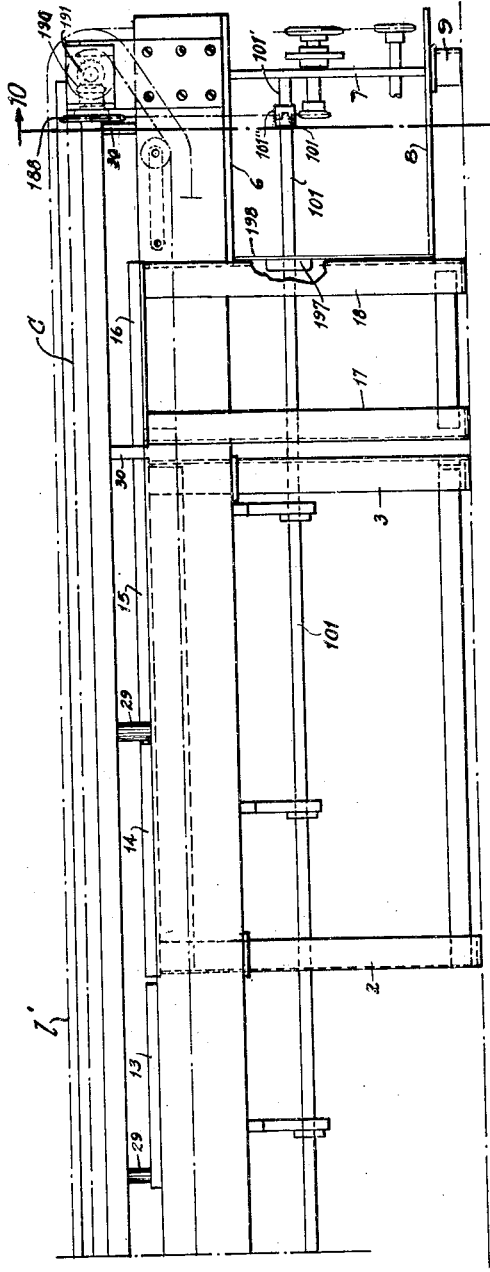
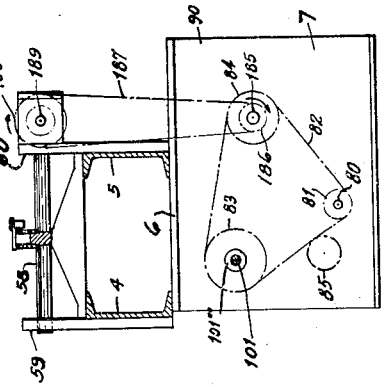
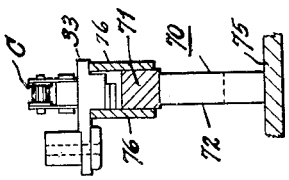
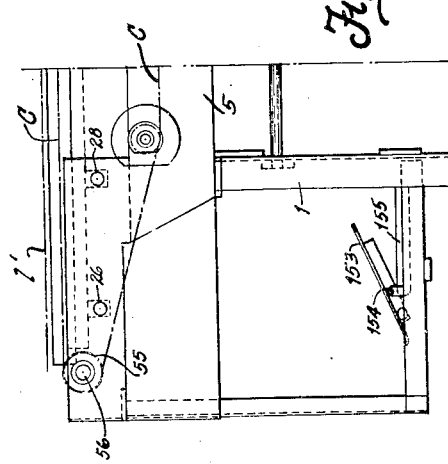
INVENTORS
James S. Burge
Hilton J. McKee
Naram M. Rider
James F. Salatin
by Spencer Hardman and Fehr
their attorneys

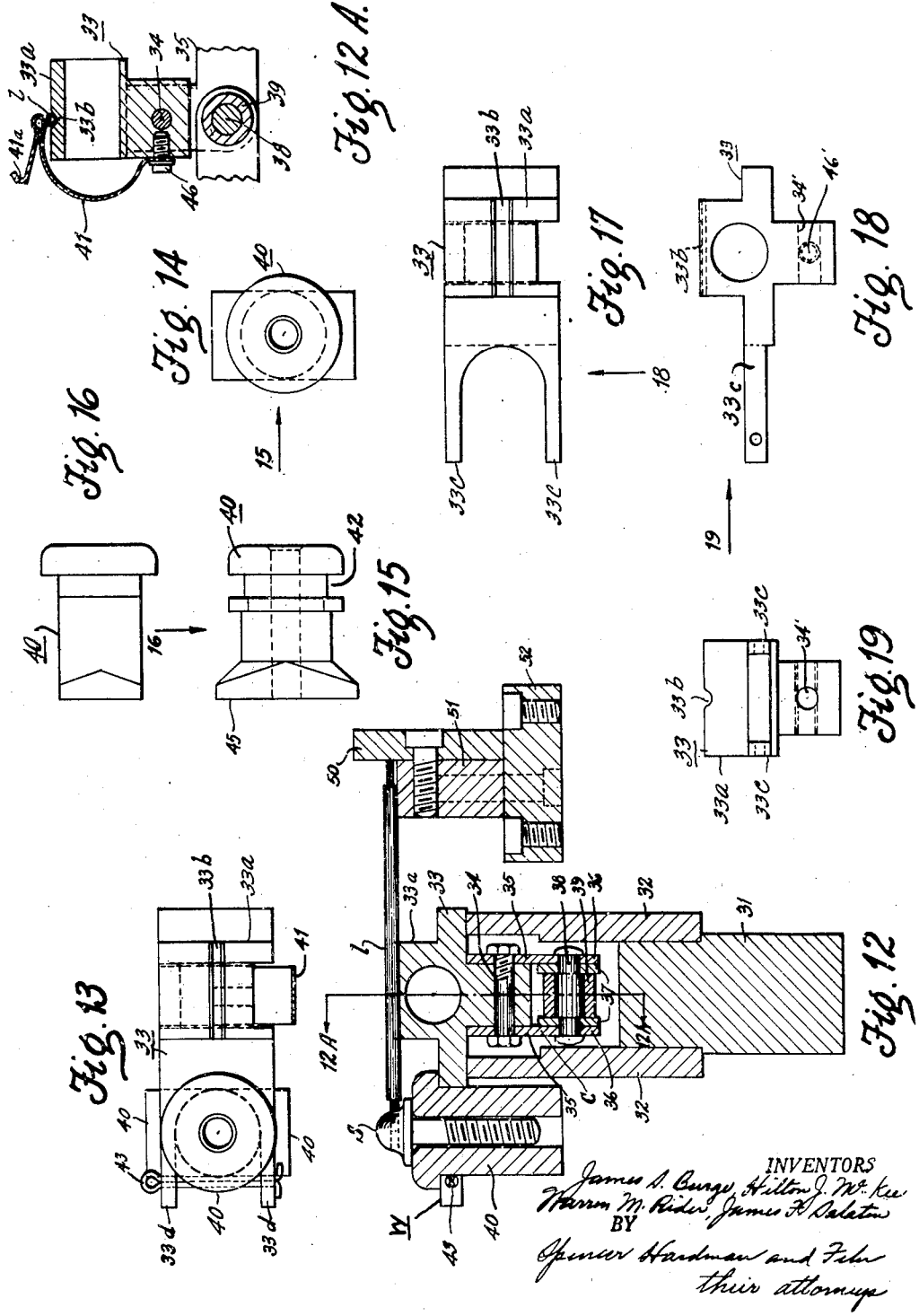

Aug. 2, 1949.    J. S. BURGE ET AL    2,477,859
APPARATUS FOR MAKING CONNECTOR ASSEMBLIES
Filed Nov. 4, 1947    34 Sheets-Sheet 6
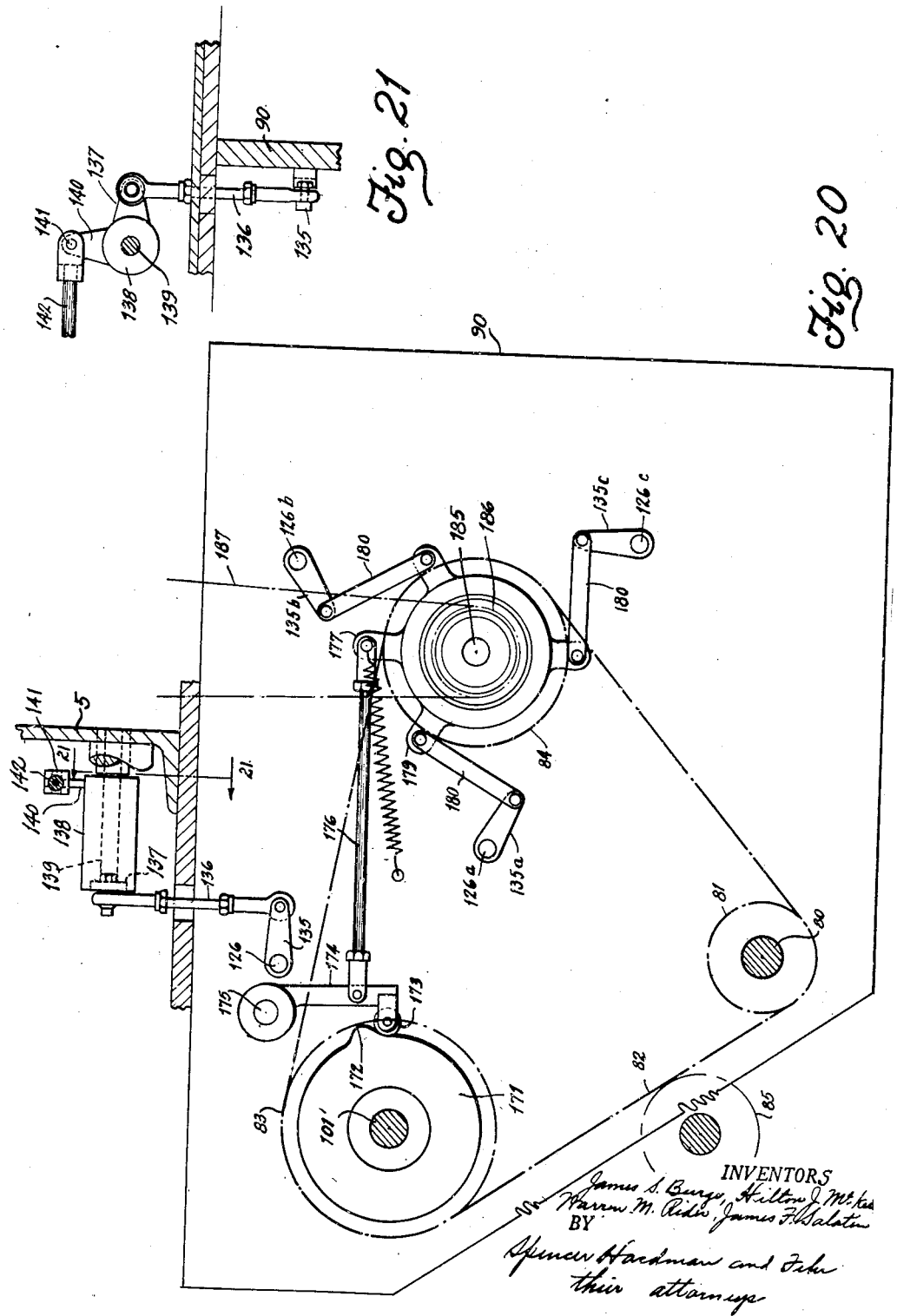

Aug. 2, 1949.　　　　J. S. BURGE ET AL　　　　2,477,859
APPARATUS FOR MAKING CONNECTOR ASSEMBLIES
Filed Nov. 4, 1947　　　　　　　　　　　　　　34 Sheets-Sheet 7

INVENTORS
James S. Burge, Hilton J. McKee
Warren M. Reder, James B. Salatin
BY
Spencer Hardman and Fisher
their attorneys Aug. 2, 1949.   J. S. BURGE ET AL   2,477,859
APPARATUS FOR MAKING CONNECTOR ASSEMBLIES
Filed Nov. 4, 1947   34 Sheets-Sheet 8

CLUTCH II

INVENTORS
James S. Burge, Hilton J. McKee
Warren M. Rider, James F. Salatin
BY
Spencer Hardman and Fehr
their attorneys Aug. 2, 1949.
J. S. BURGE ET AL
2,477,859
APPARATUS FOR MAKING CONNECTOR ASSEMBLIES
Filed Nov. 4, 1947
34 Sheets-Sheet 9
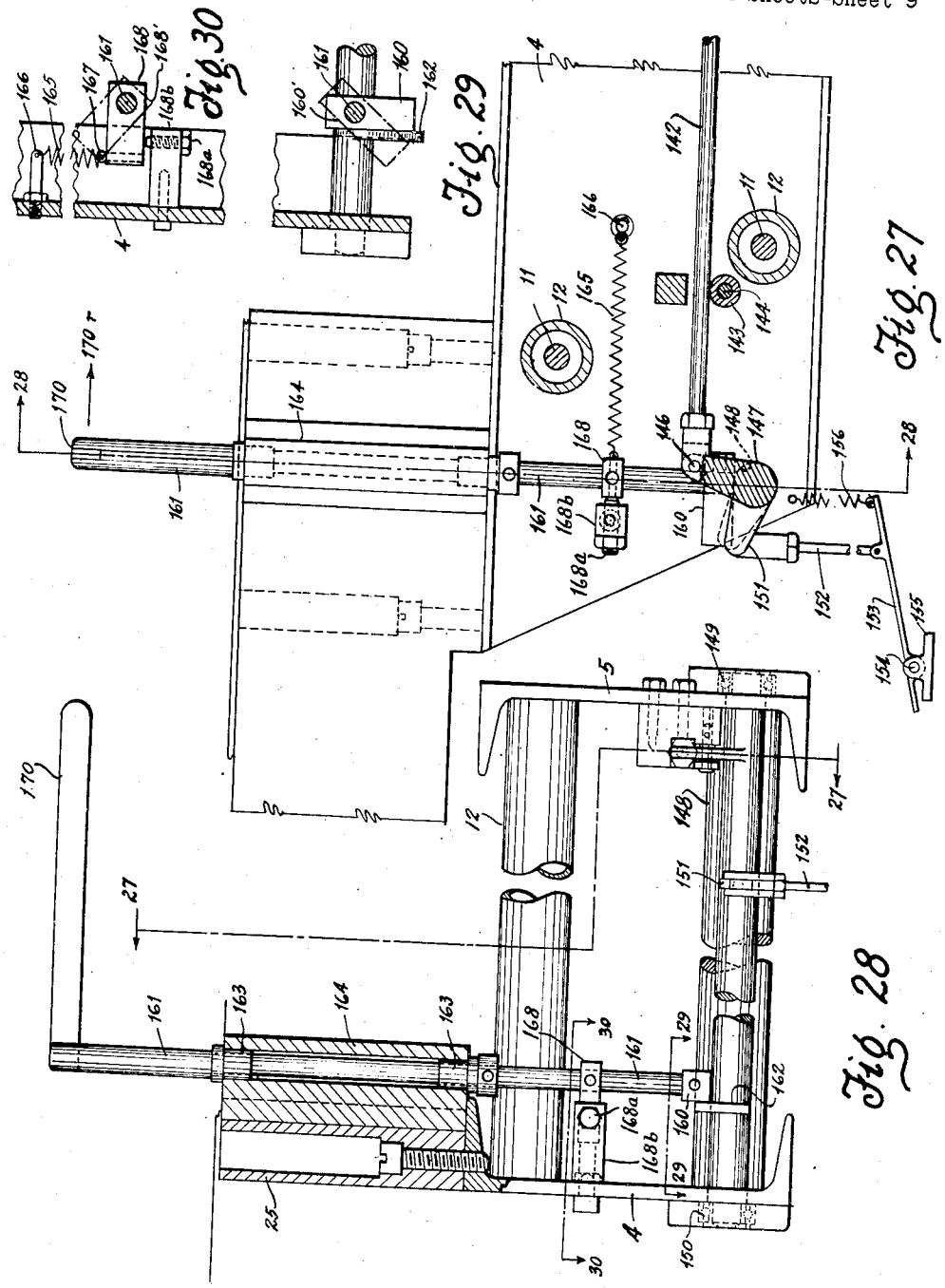

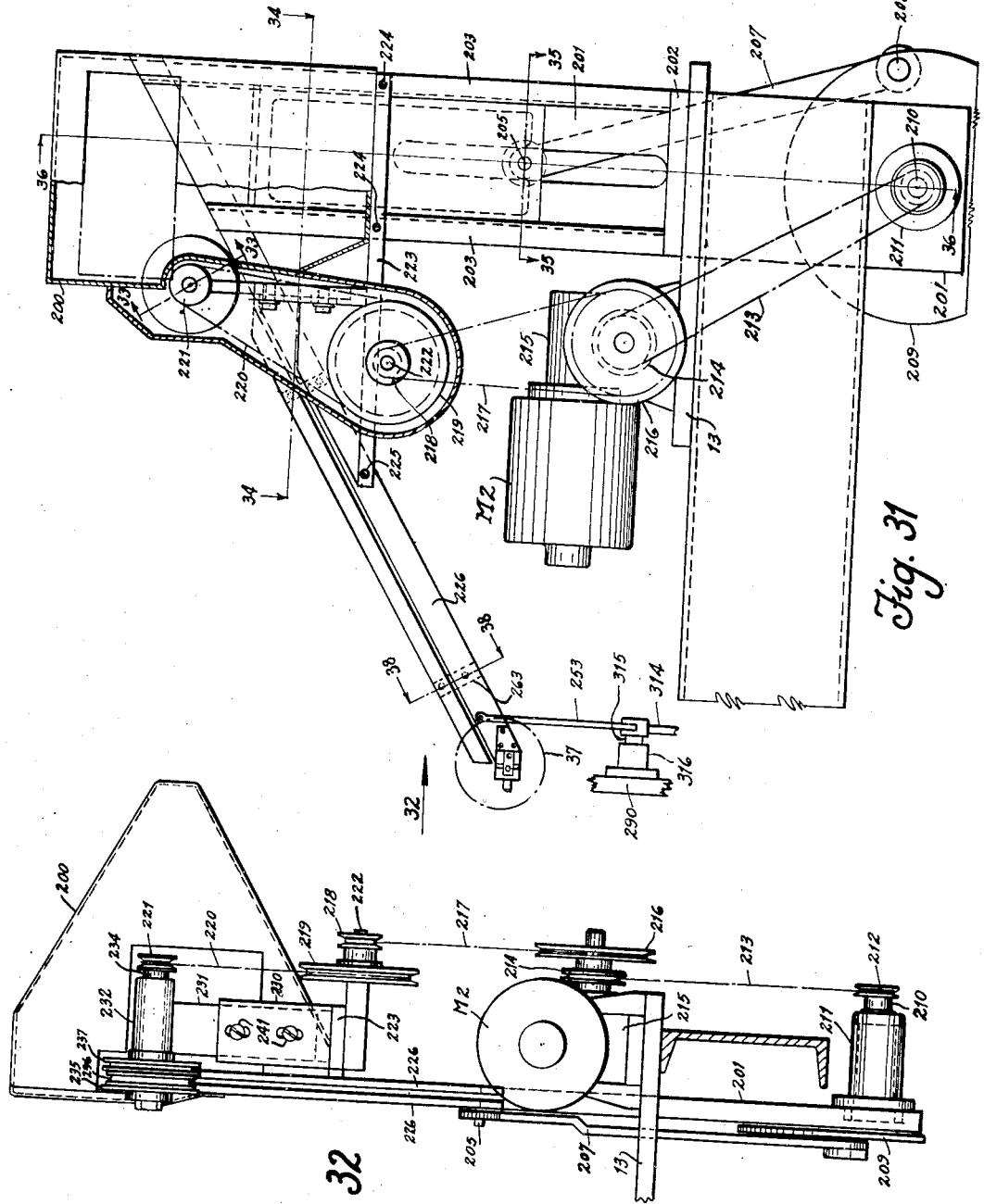

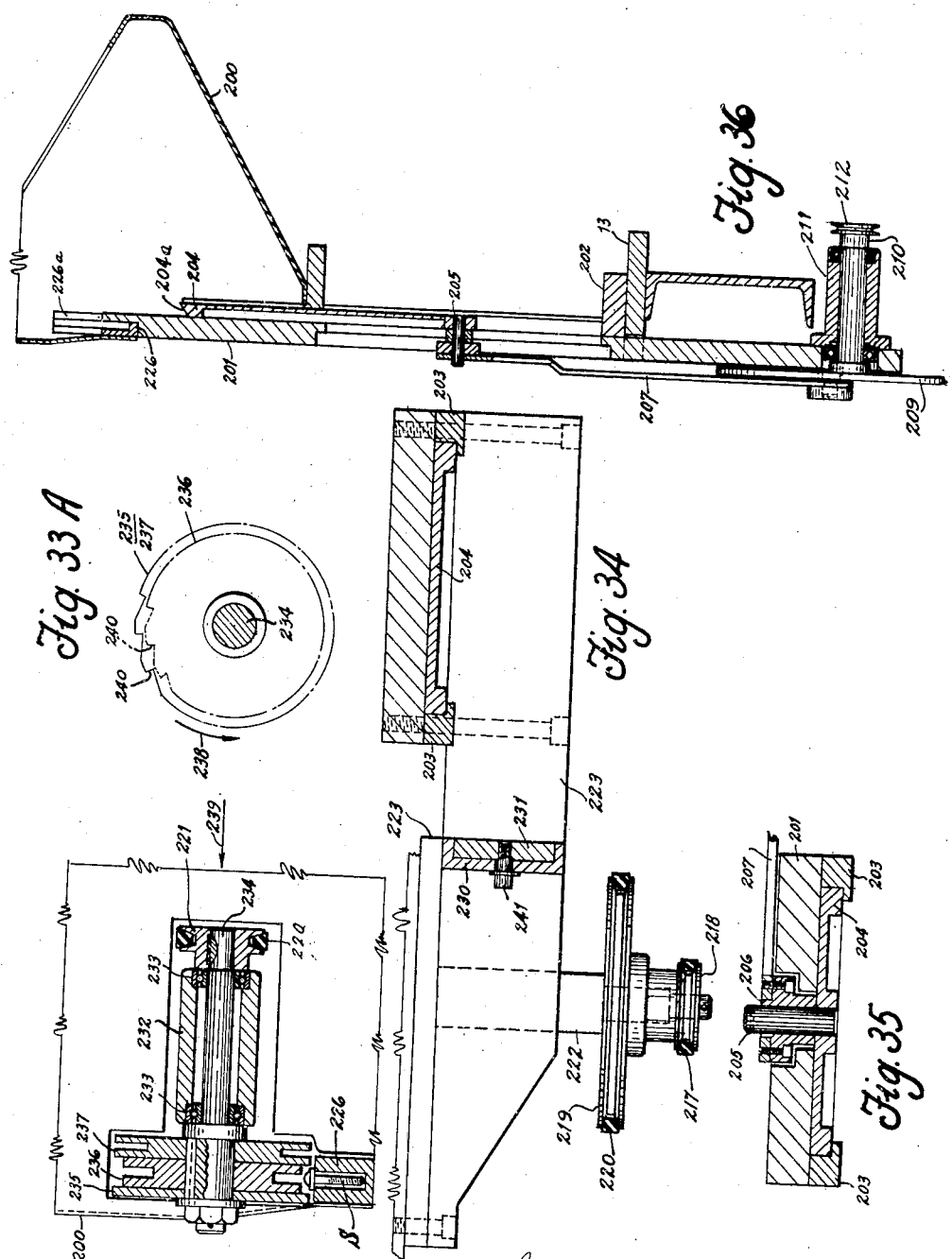

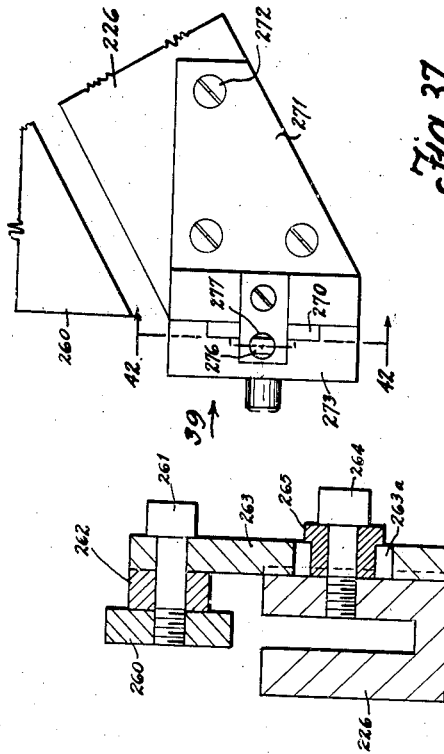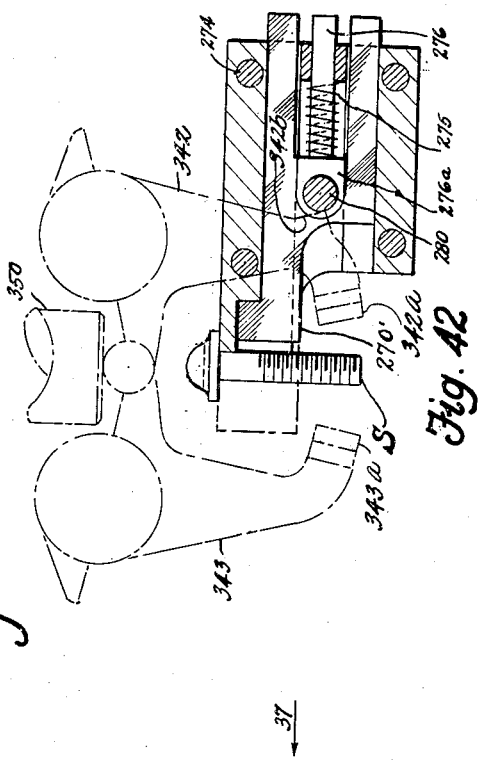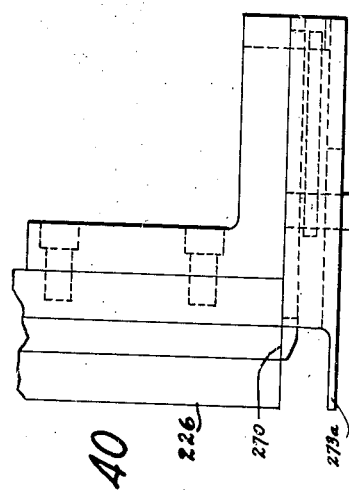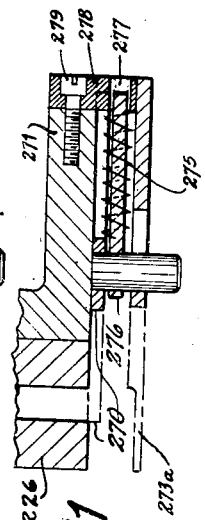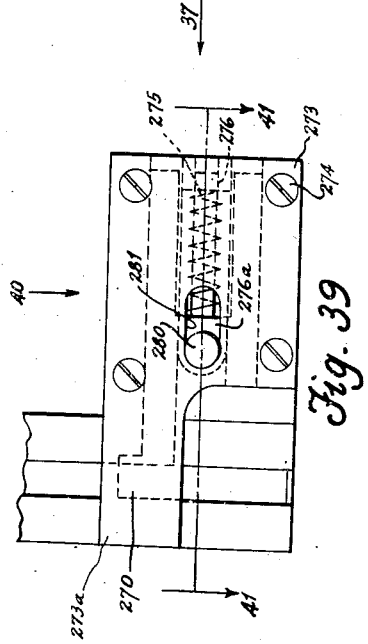

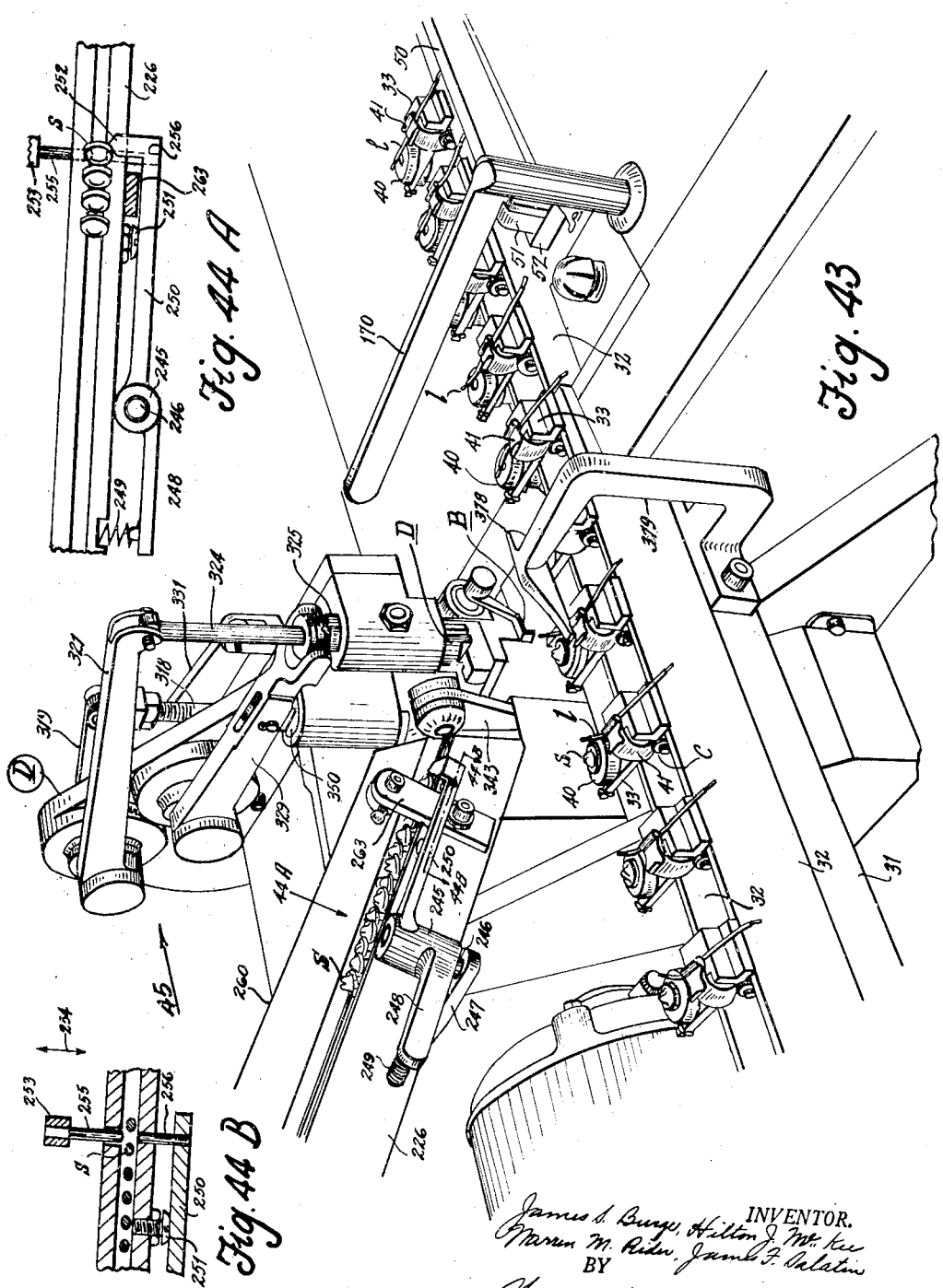

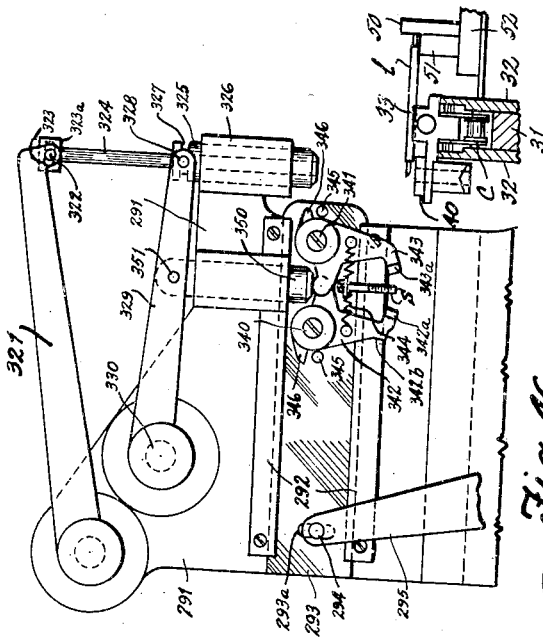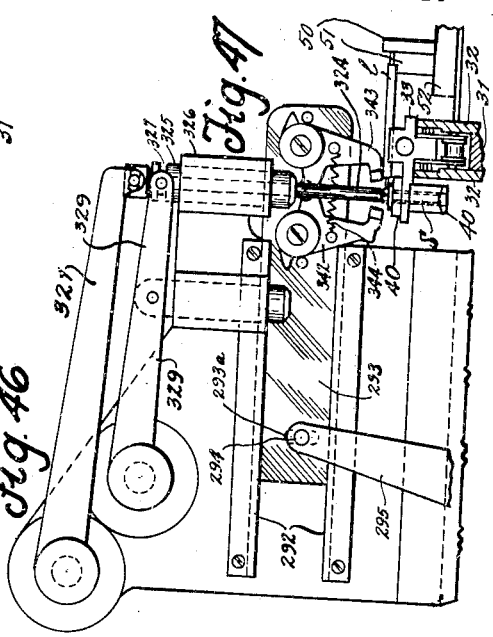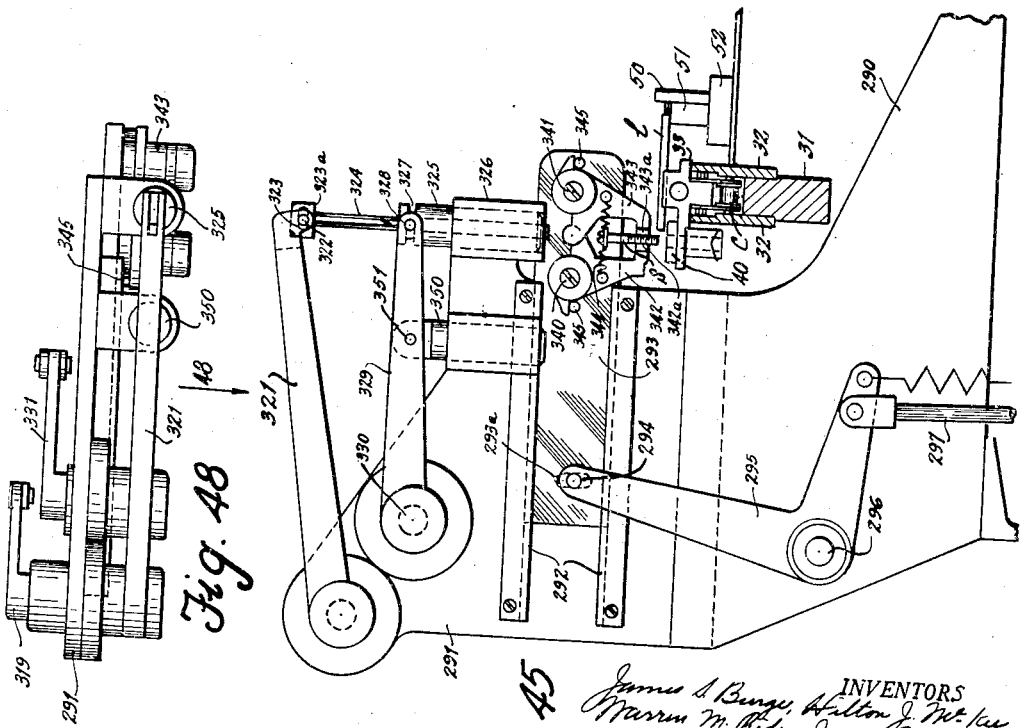

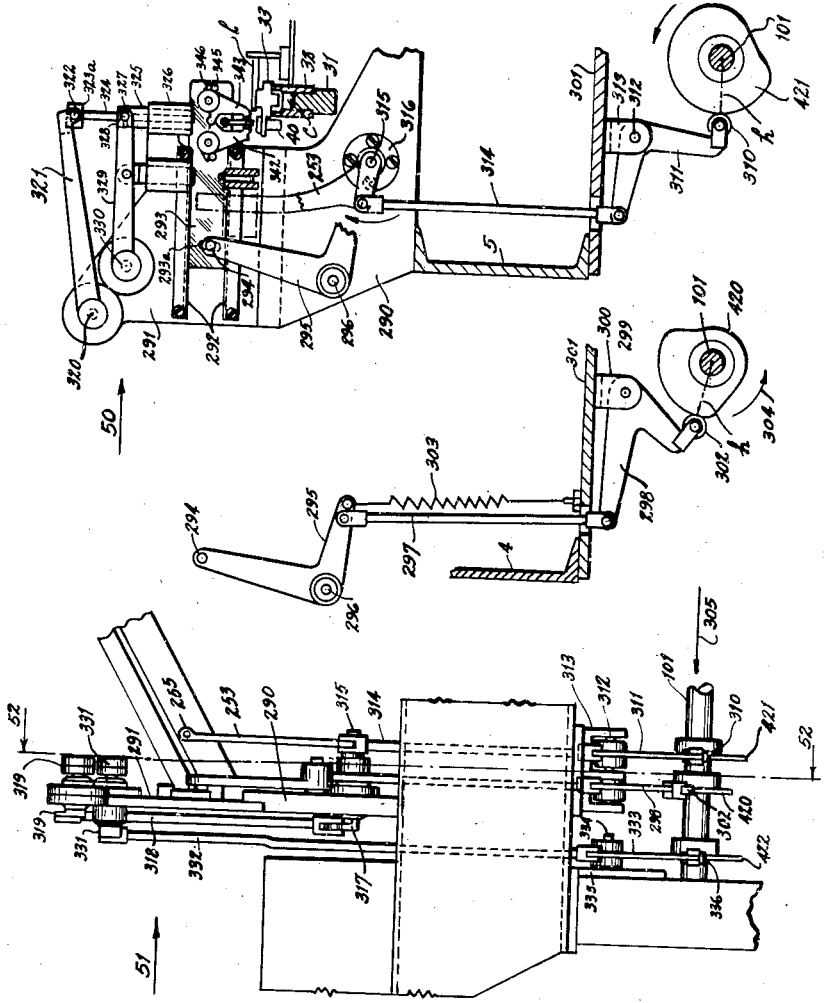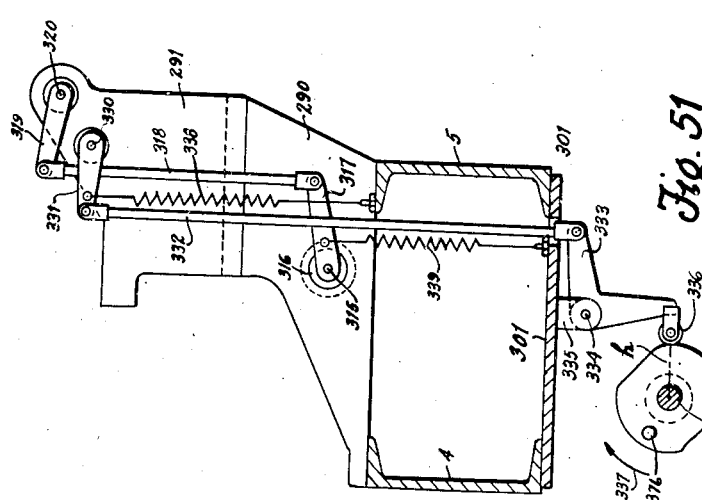

Aug. 2, 1949.　　　J. S. BURGE ET AL　　　2,477,859
APPARATUS FOR MAKING CONNECTOR ASSEMBLIES
Filed Nov. 4, 1947　　　　　　　　　　　　34 Sheets-Sheet 16

INVENTORS
James S. Burge, Hilton J. McKee,
Warren M. Rider, James F. Salatin
BY
Spencer, Hardman & Fehr
their attorneys Aug. 2, 1949.  J. S. BURGE ET AL  2,477,859
APPARATUS FOR MAKING CONNECTOR ASSEMBLIES
Filed Nov. 4, 1947  34 Sheets-Sheet 17

INVENTORS
James S. Burge, Hilton J. McKee
Warren M. Rider, James F. Salatin
BY
Spencer Hardman & Fehr
their attorneys Aug. 2, 1949. J. S. BURGE ET AL 2,477,859
APPARATUS FOR MAKING CONNECTOR ASSEMBLIES
Filed Nov. 4, 1947 34 Sheets-Sheet 18

INVENTORS
James S. Burge, Hilton J. McKee
Warren M. Rider, James P. Dalton
BY
Spencer Hardman and Fehr
their attorneys

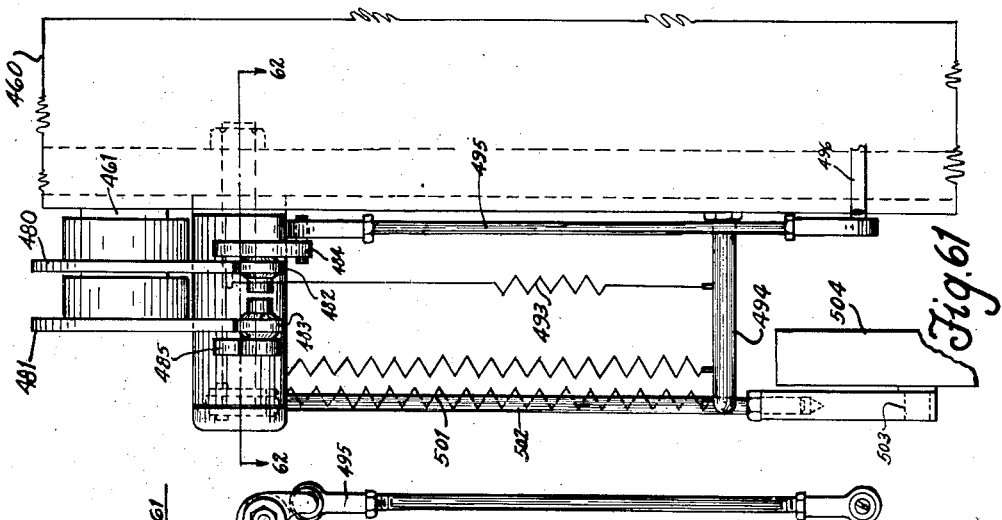

Aug. 2, 1949. J. S. BURGE ET AL 2,477,859
APPARATUS FOR MAKING CONNECTOR ASSEMBLIES
Filed Nov. 4, 1947 34 Sheets-Sheet 21
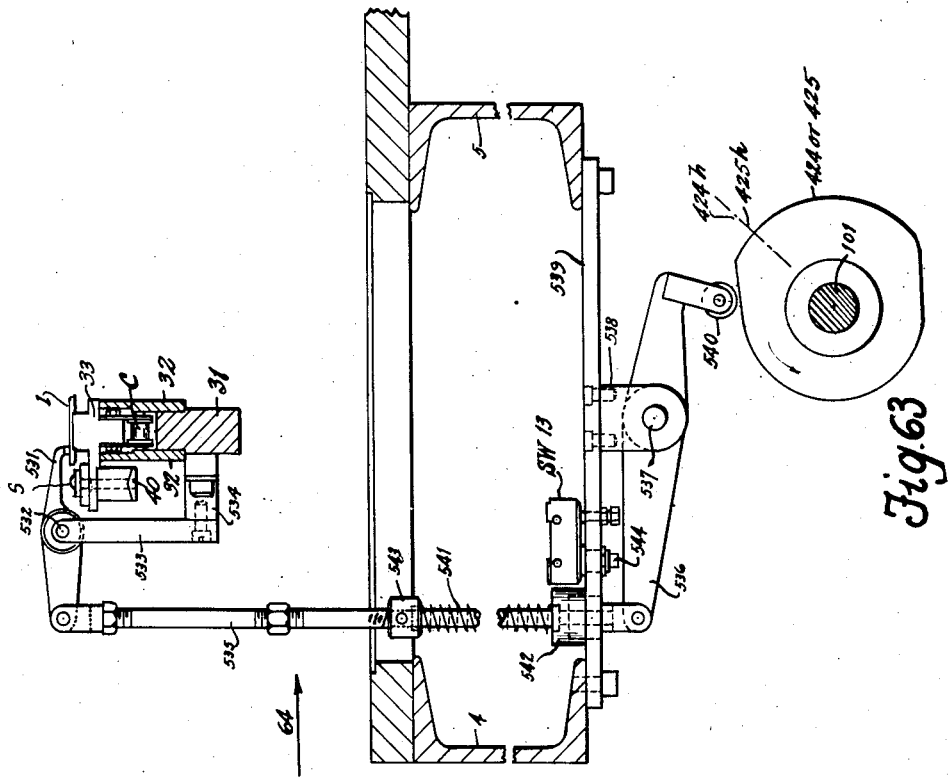
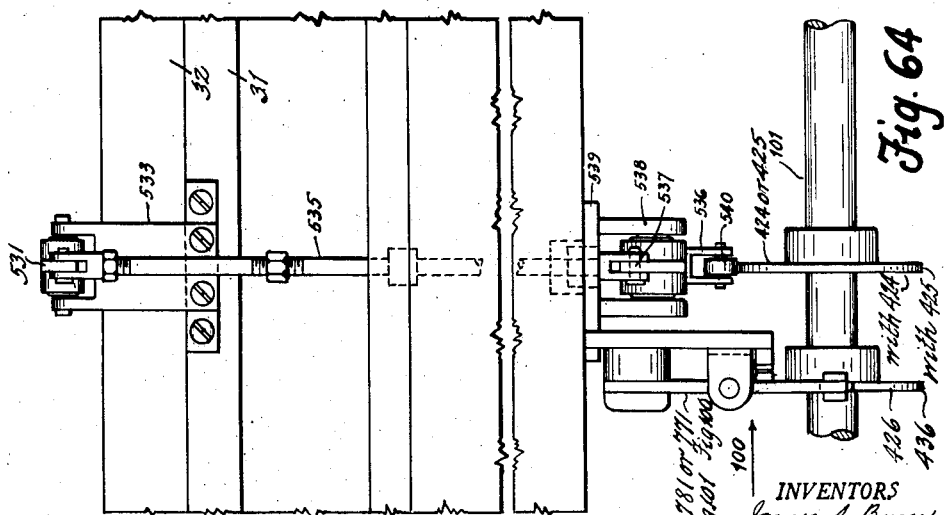

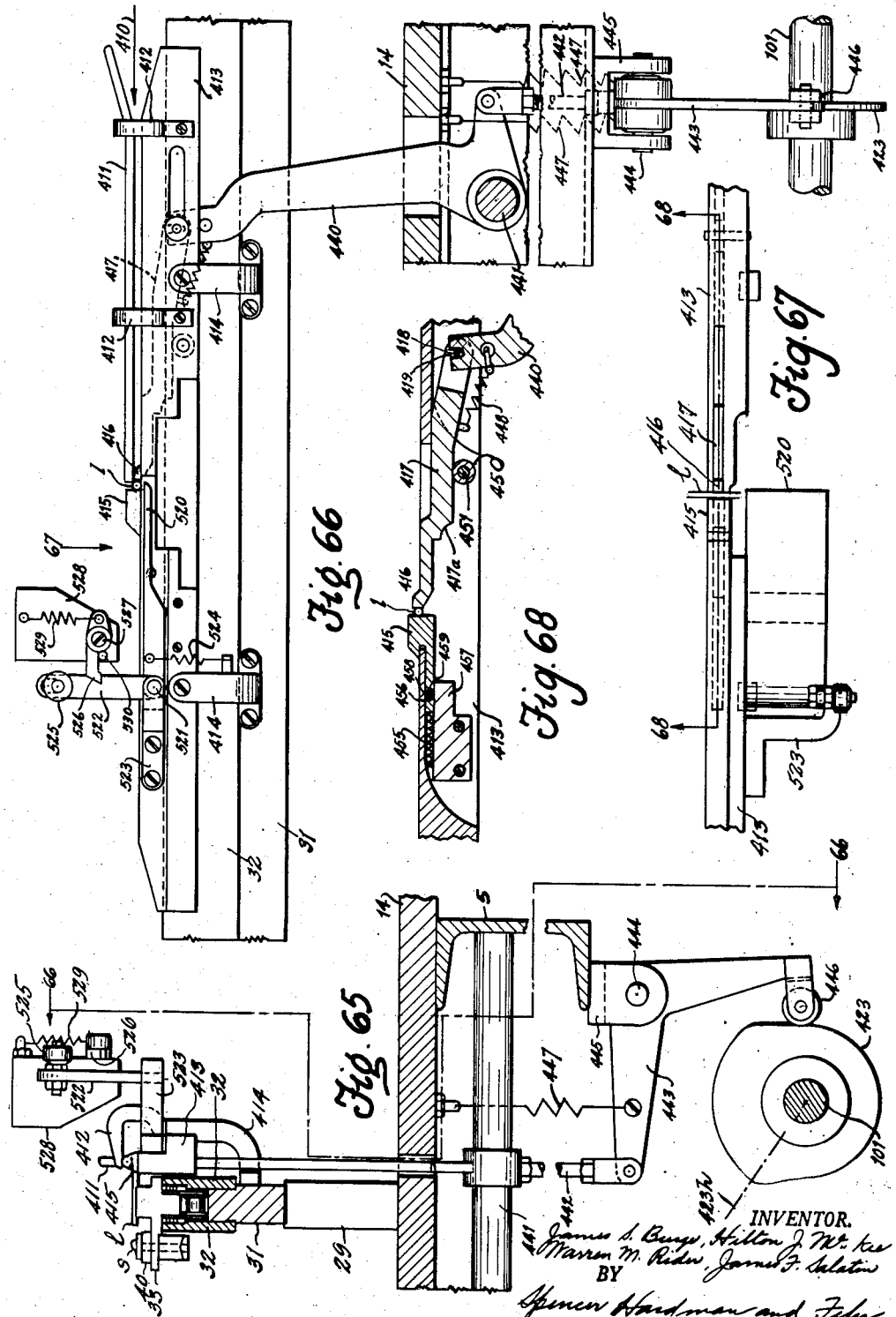

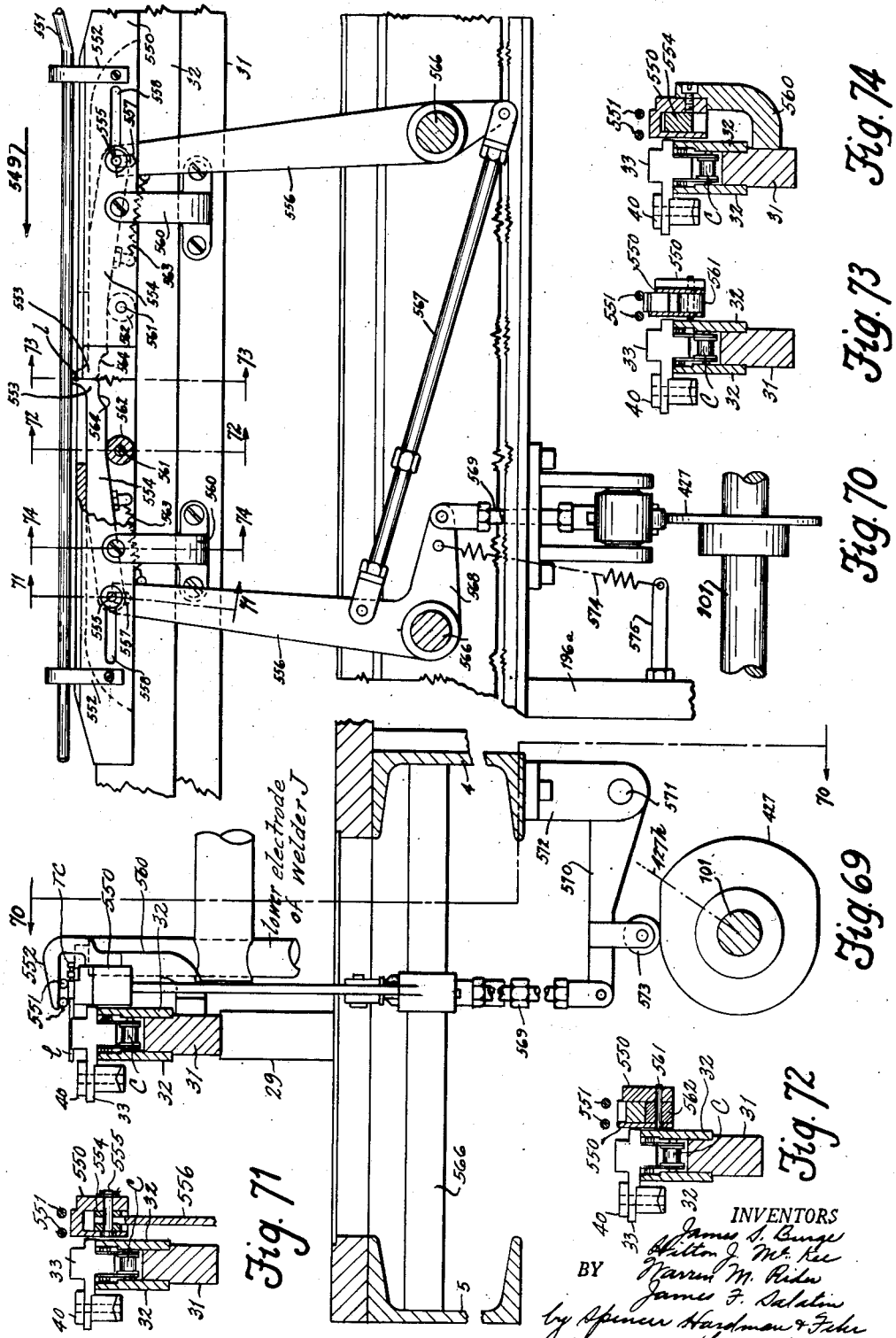

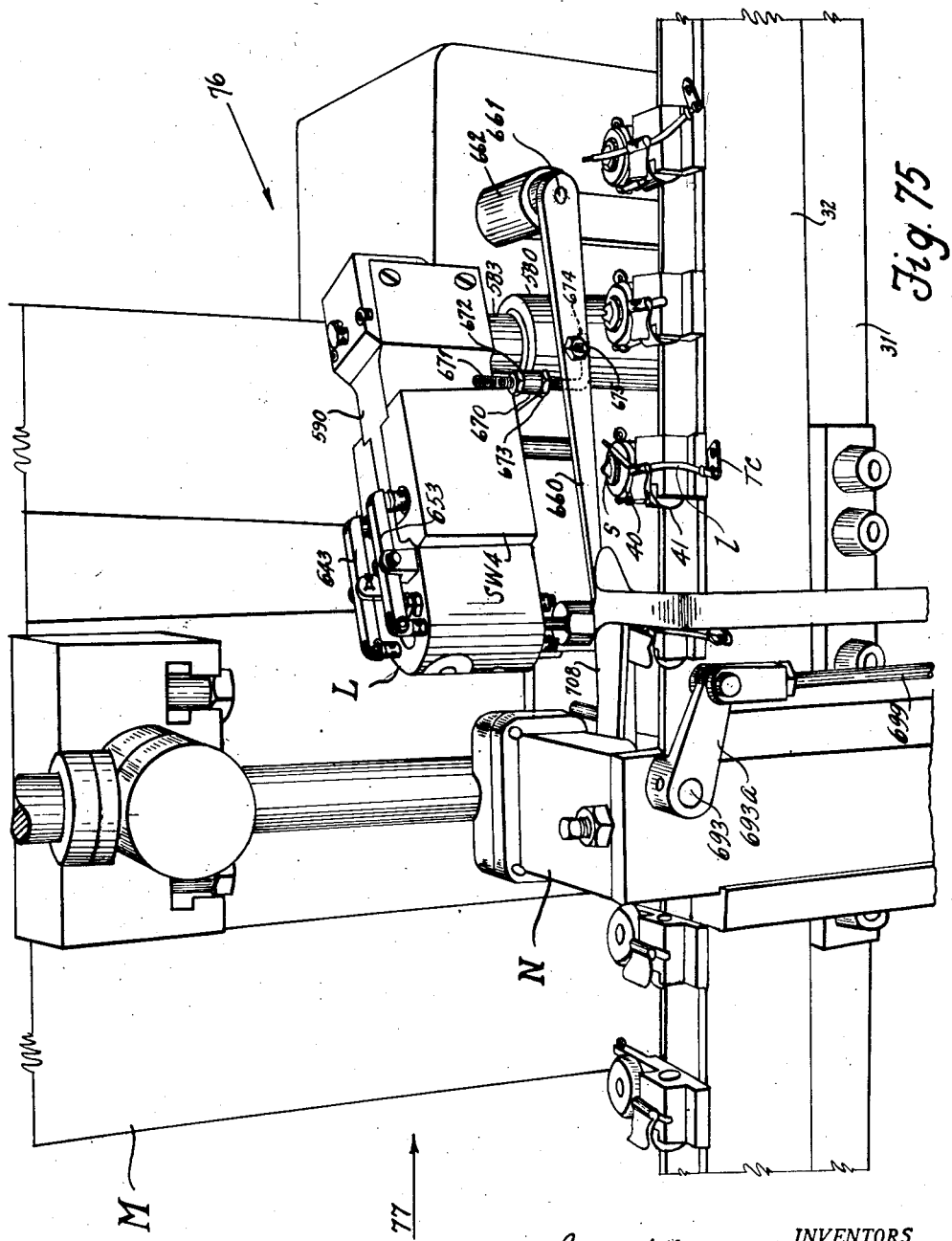

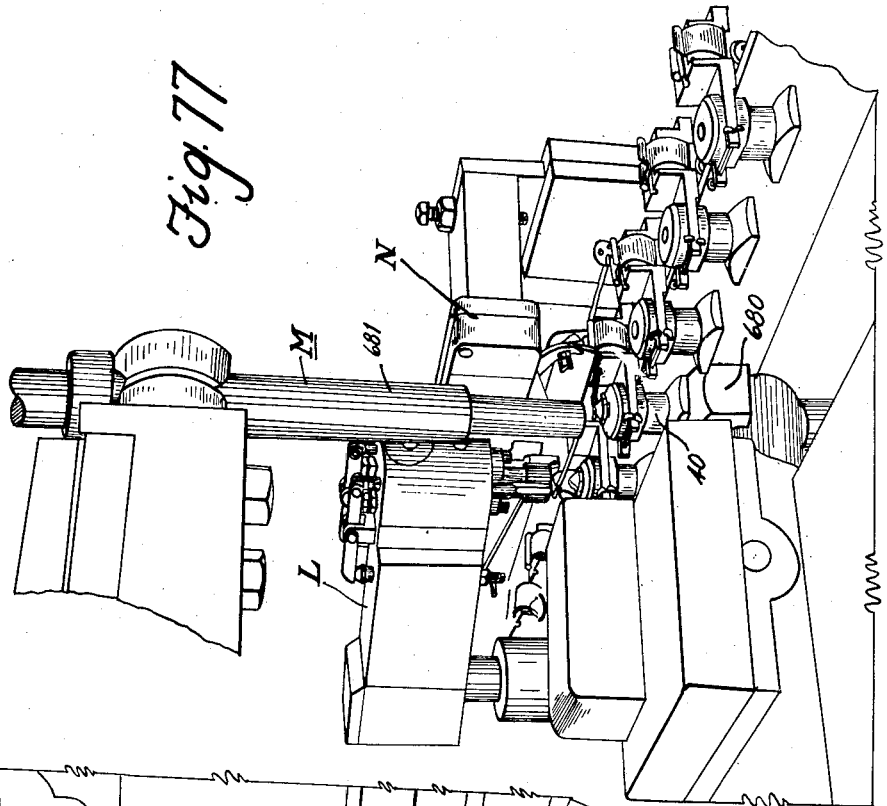
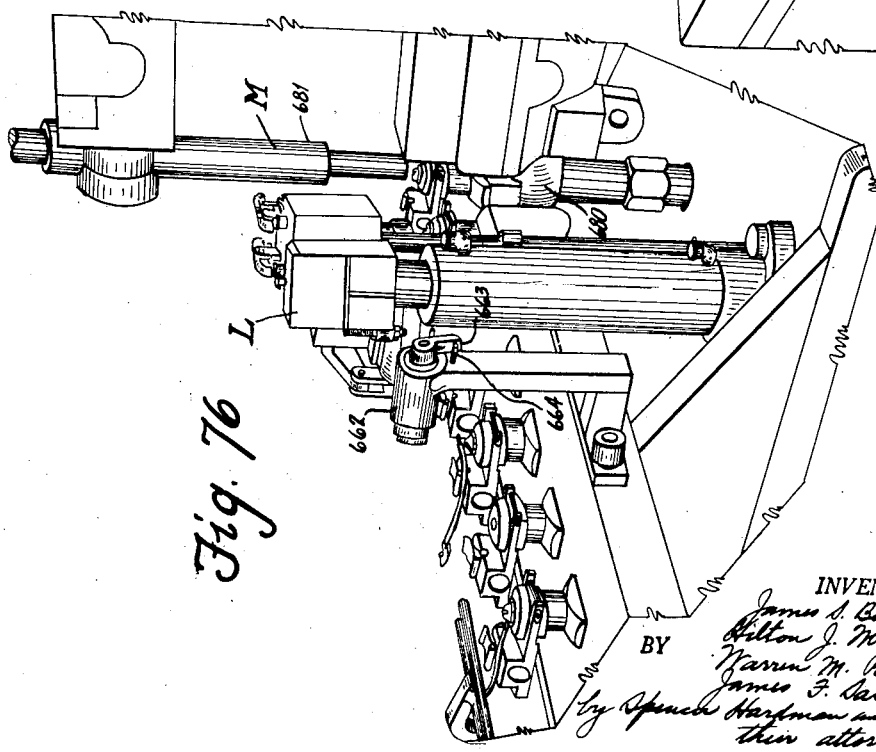

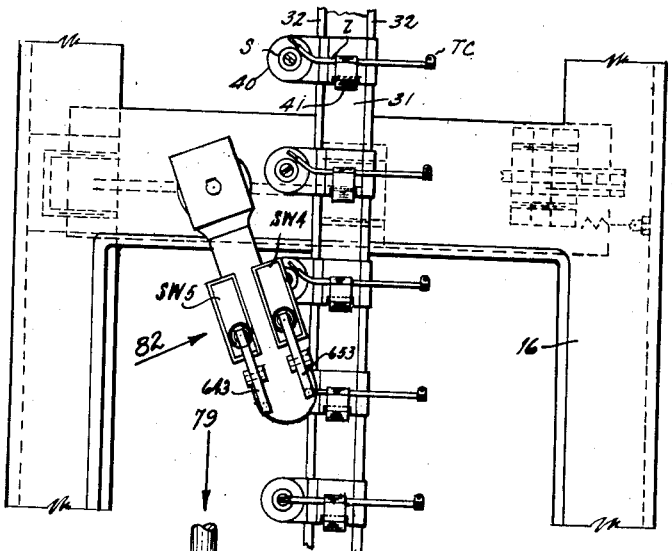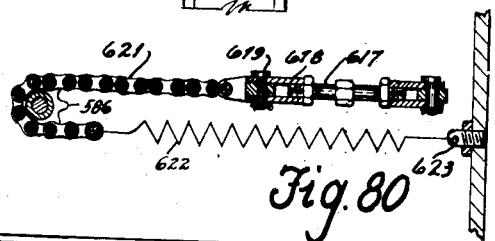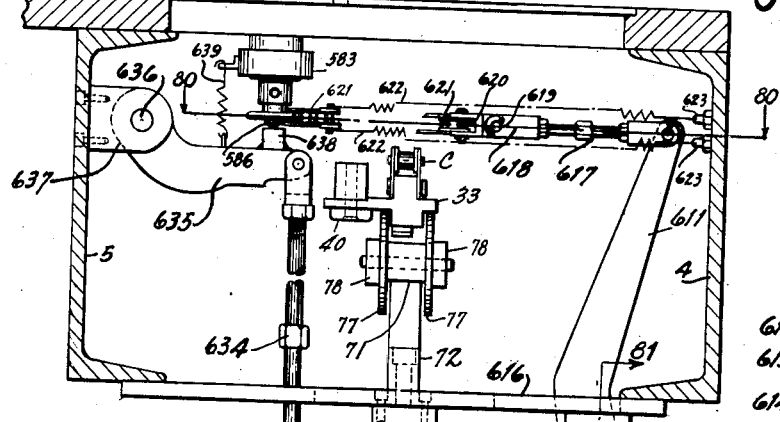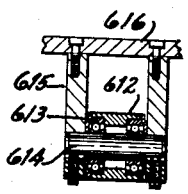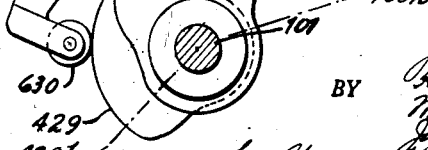

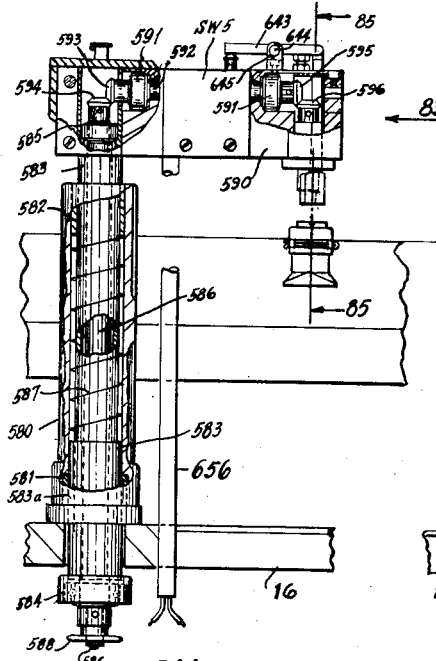
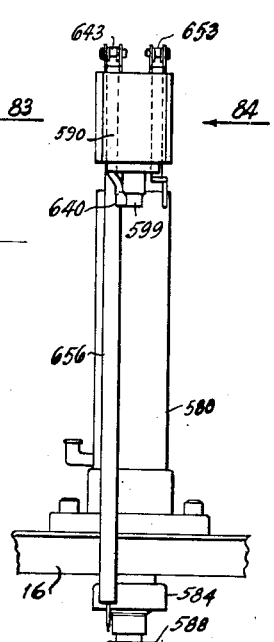
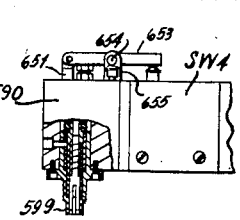
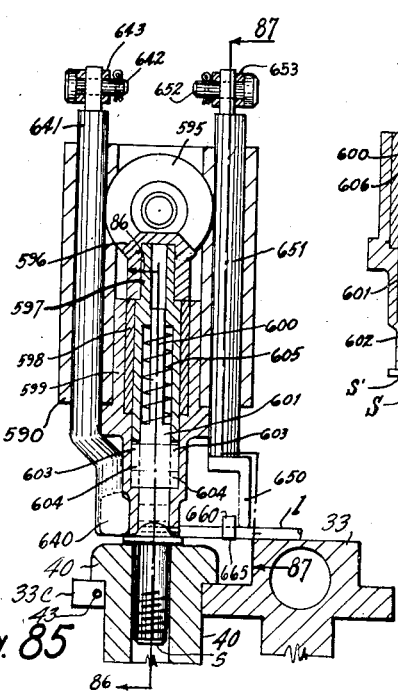
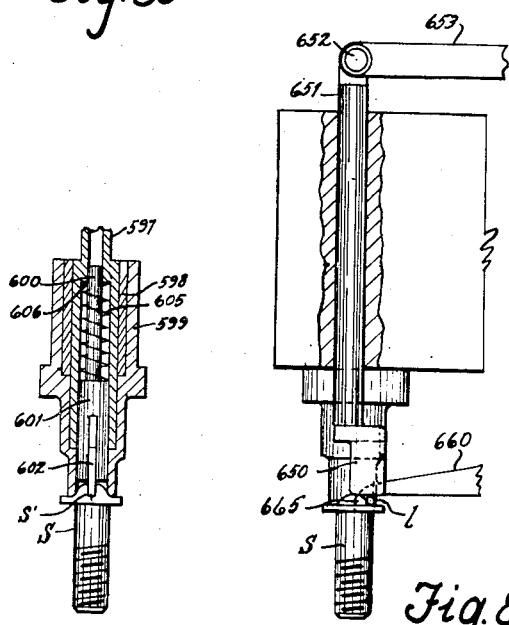

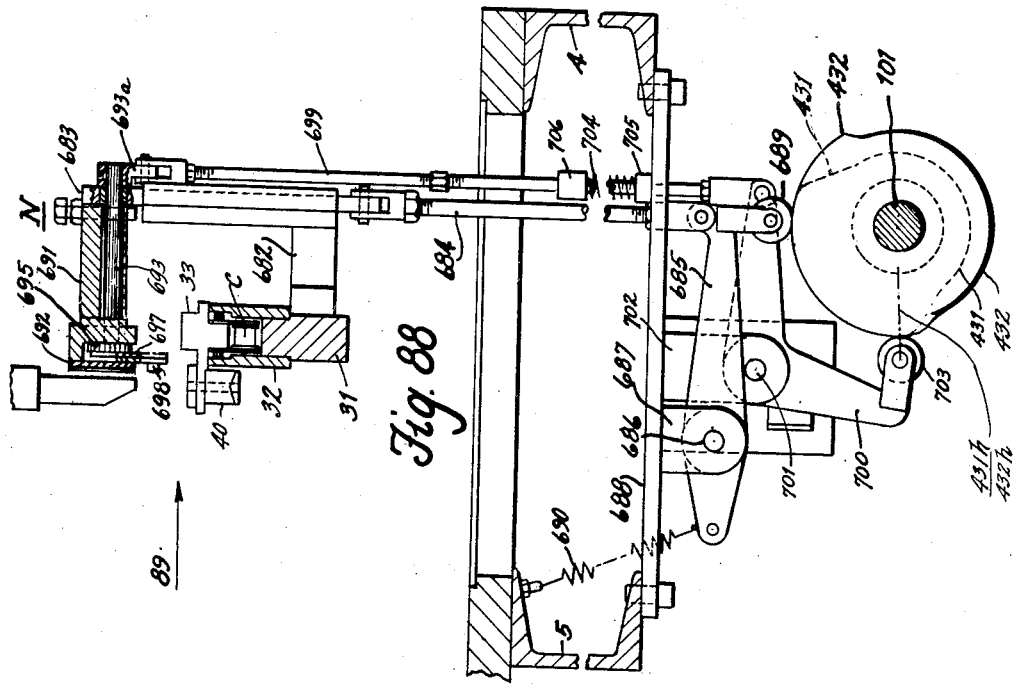
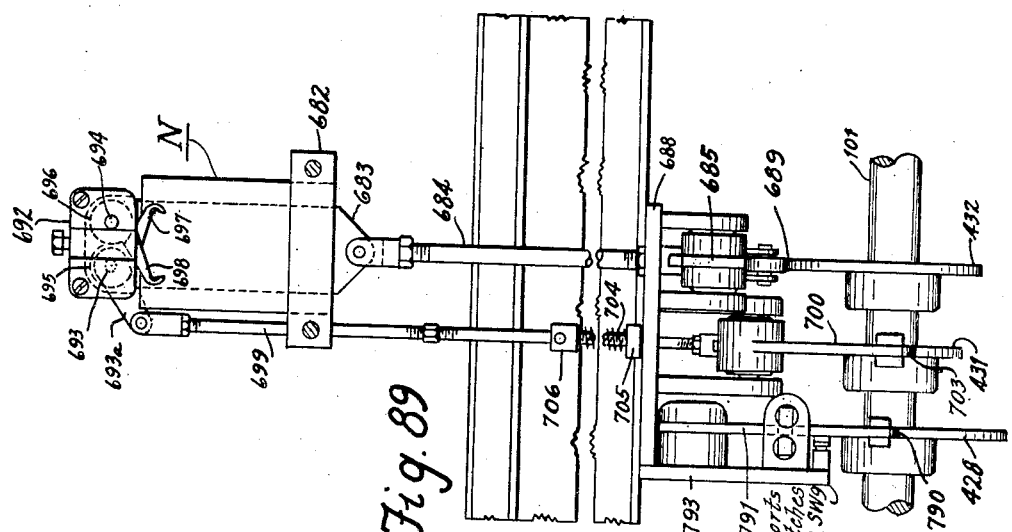

Aug. 2, 1949. J. S. BURGE ET AL 2,477,859
APPARATUS FOR MAKING CONNECTOR ASSEMBLIES
Filed Nov. 4, 1947 34 Sheets-Sheet 29
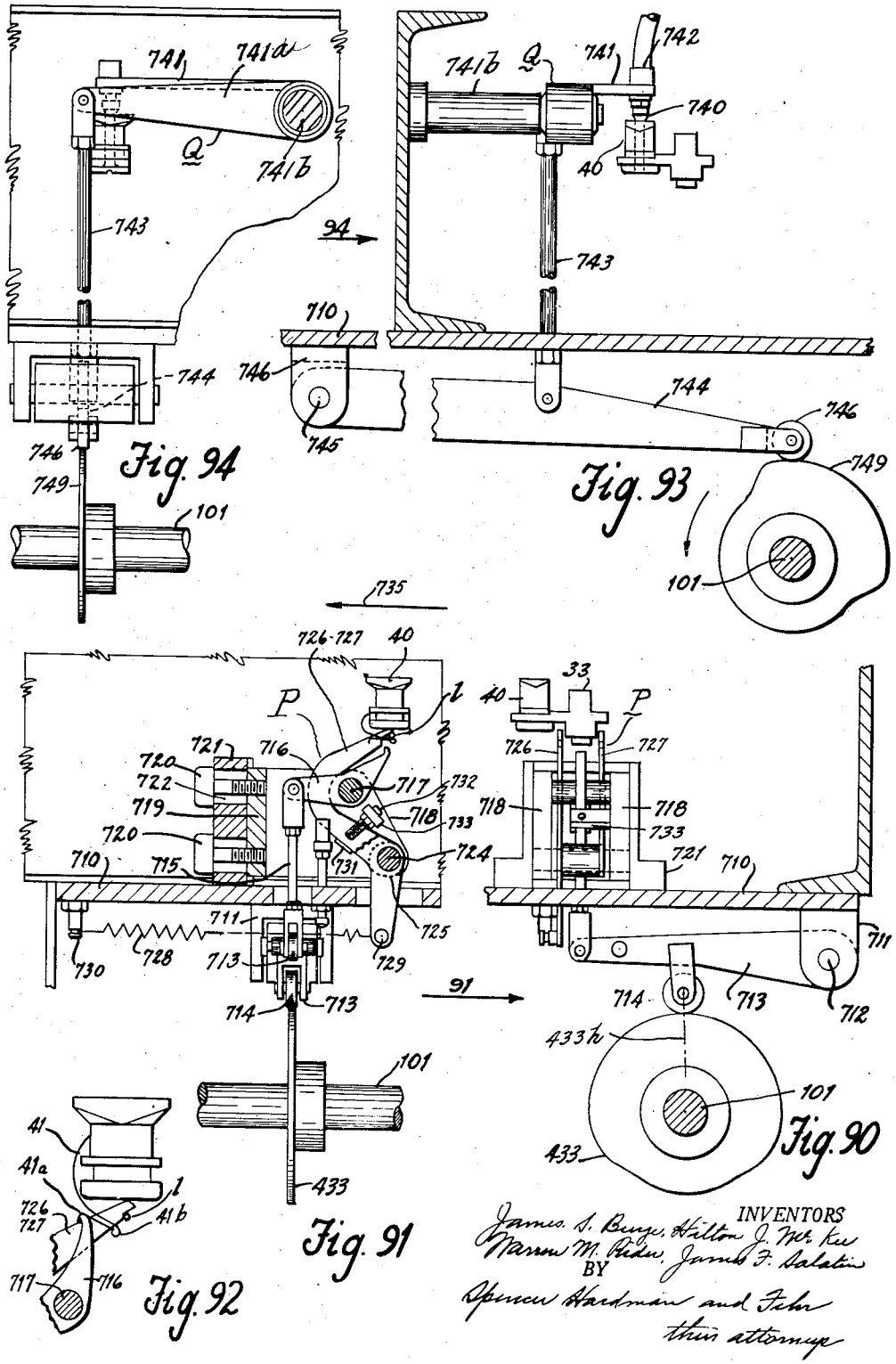

Aug. 2, 1949.  J. S. BURGE ET AL  2,477,859
APPARATUS FOR MAKING CONNECTOR ASSEMBLIES
Filed Nov. 4, 1947  34 Sheets-Sheet 30
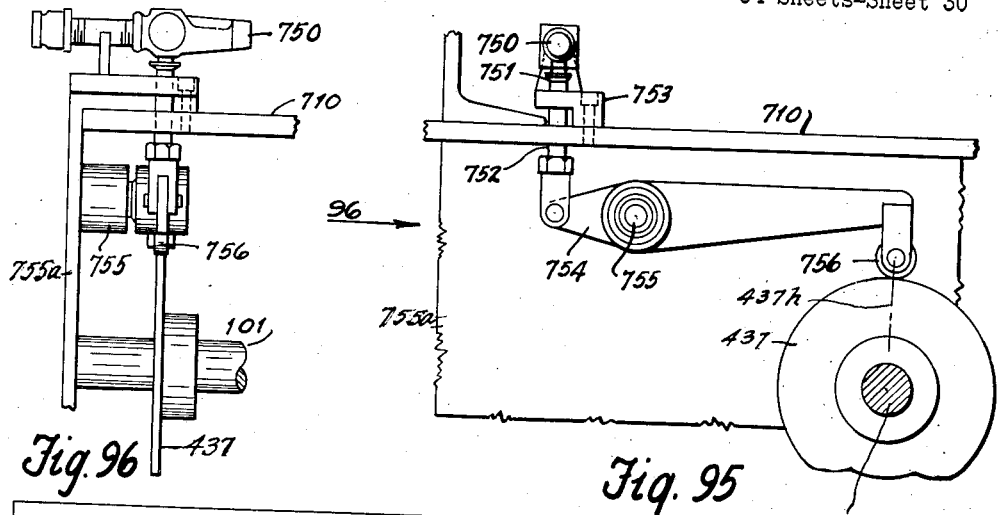
Fig. 95
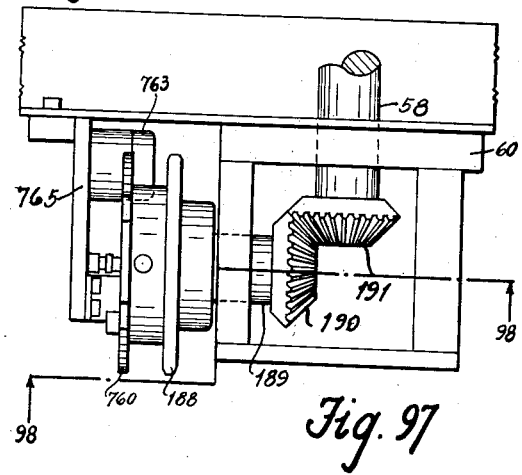
Fig. 96
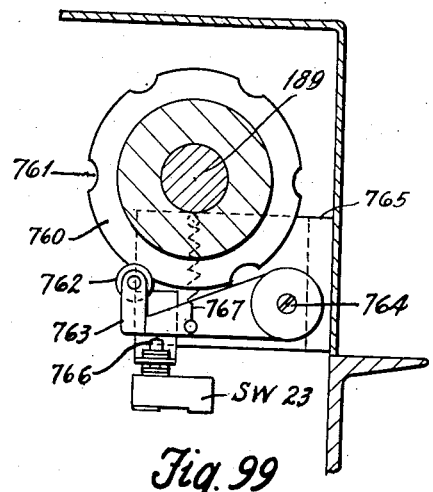
Fig. 99
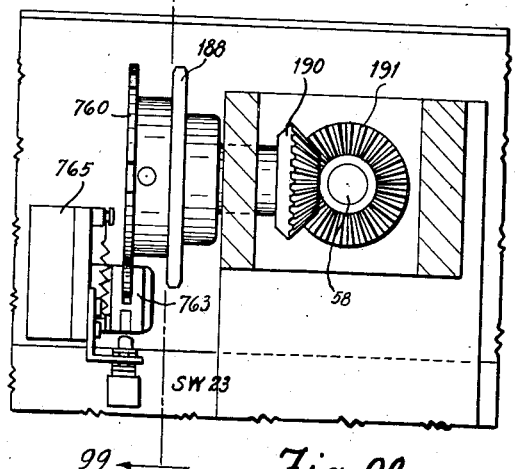
Fig. 97
Fig. 98
INVENTORS
James S. Burge
Hilton J. McKee
BY Warren M. Rider
James F. Salatin
by Spencer Hardman and Fehr
their attorneys

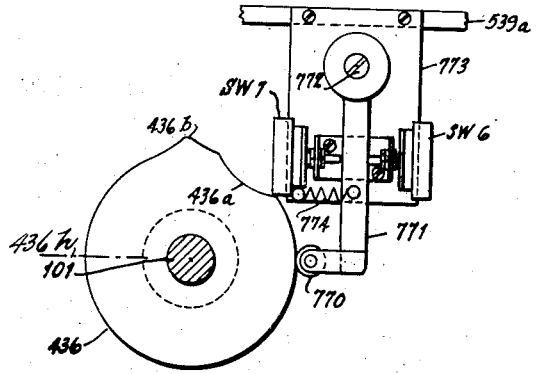
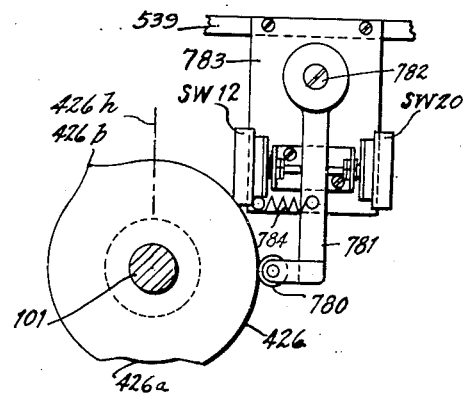
Fig. 100  Fig. 101
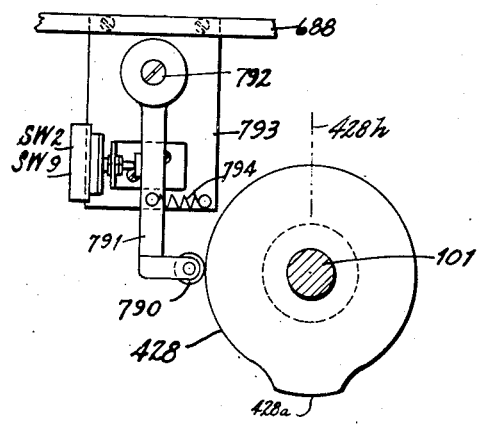
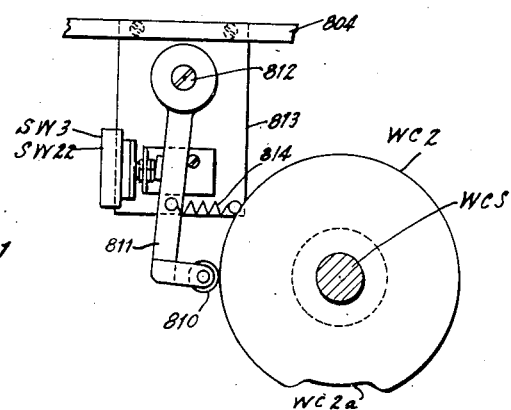
Fig. 102  Fig. 104
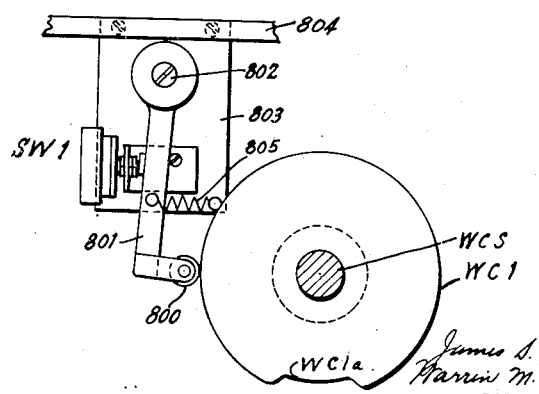
Fig. 103

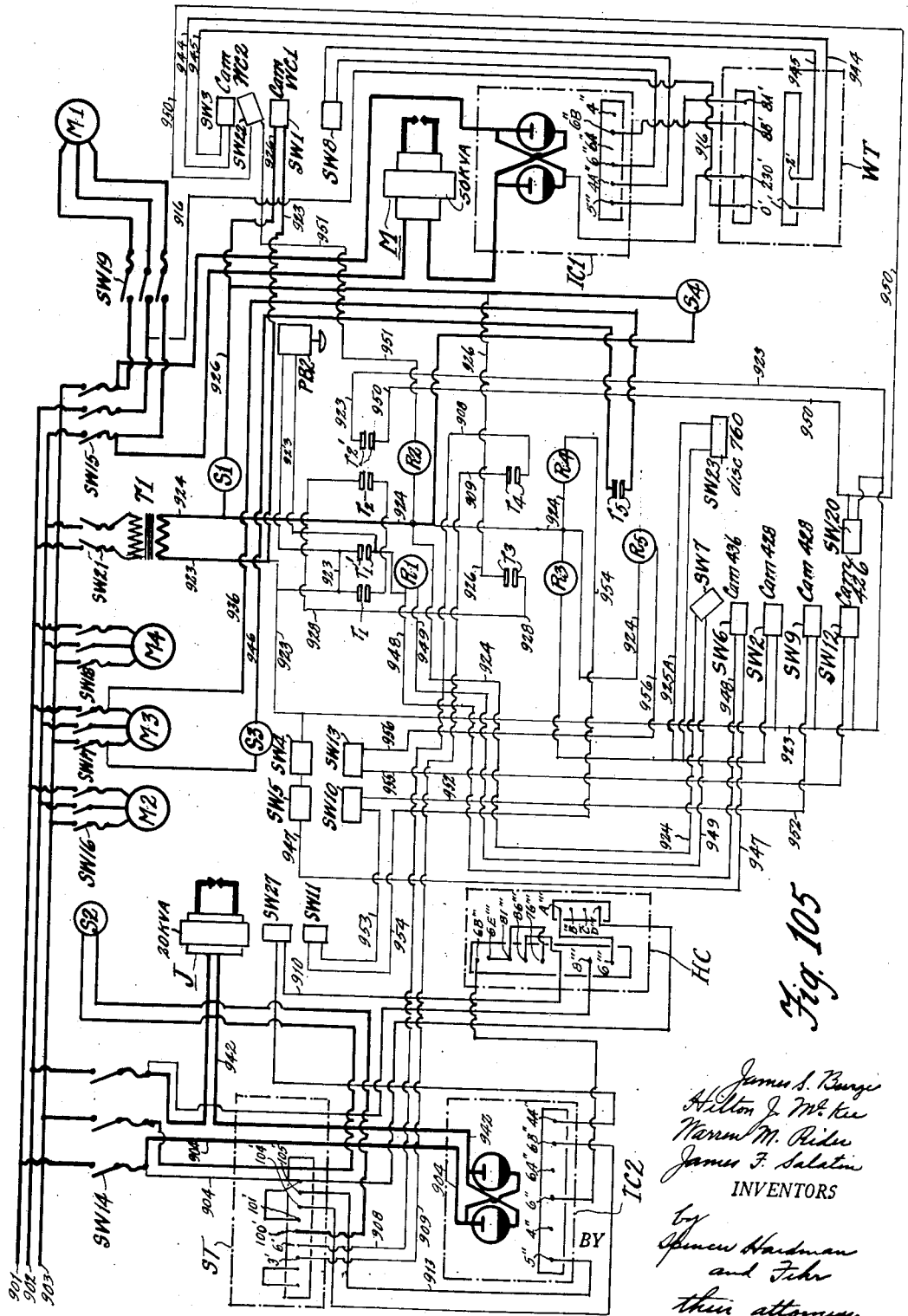

Fig. 107

Patented Aug. 2, 1949

2,477,859

UNITED STATES PATENT OFFICE 2,477,859

APPARATUS FOR MAKING CONNECTOR ASSEMBLIES

James S. Burge, Warren M. Rider, and James F. Salatin, Anderson, and Hilton J. McKee, Middletown, Ind., assignors to General Motors Corporation, Detroit, Mich., a corporation of Delaware Application November 4, 1947, Serial No. 783,982

16 Claims. (Cl. 219—4)

This invention relates to the manufacture of electrical connector assemblies for use in connecting a part of an electrical apparatus with a terminal.

An object of the invention is to provide a machine which operates automatically to form a connector clip and attach it to one end of a wire, to unite the clip and wire permanently by welding and to weld the other end of the wire to a terminal post or stud. In the disclosed embodiment thereof, the invention comprises a conveyor carrying a plurality of work holders each adapted to receive a wire and a stud. At a wire loading station, the wires are placed manually upon the work holders and are secured thereon by retainers. The studs are fed automatically from a hopper to the work holders as they are moved by the conveyor to a stud feeding station. At the clip attaching station, a punch press makes a clip and attaches it to one end of the wire. At the first welding station, the clip and wire are welded together. At a second welding station, the wire and stud are welded together. At the second station, means are provided for locating the wires so that they will not interfere with feeding studs to the work holders. At the third station, means are provided for placing the wire in proper location for receiving the clip and means are provided for withholding operation of the punch press in case a wire is absent from the work holder when at the second station. At the fourth station, means are provided for placing the wire in proper location for the first welding operation and means are provided for withholding operation of the first welder in case a wire is absent from the work holder when at the third station. At or adjacent to the fifth station, devices are provided for turning the stud so that a cross slot in its head will be in position to receive the wire and for placing the wire in the cross slot. Adjacent the fifth station, devices are provided for withholding operation of the second welder in case either the wire or the stud are missing. At the sixth station, the assembled parts are automatically ejected.

Further objects and advantages of the present invention will be apparent from the following description, reference being had to the accompanying drawings, wherein a preferred embodiment of the present invention is clearly shown.

In the drawings:

Fig. 1 is a side view in perspective of the machine.

Fig. 2 and 3 taken together constitute a diagrammatic plan view of the machine frame with references to the drawings showing details of parts.

Figs. 4 and 5 taken together constitute a plan view similar to Figs. 2 and 3 showing the conveyor tracks.

Figs. 6 and 7 taken together constitute a diagrammatic sectional view showing a view of the conveyor track details and a side view of the cam shaft.

Figs. 8 and 9 taken together constitute a diagrammatic side view of the machine.

Fig. 10 is a sectional view on the line 10—10 of Fig. 8.

Fig. 11 is a sectional view of the conveyor on line 11—11 of Fig. 6, showing a work holder in inverted position on the under run of the conveyor.

Fig. 12 is a sectional view on a larger scale than Fig. 11 showing details of the work holder on the upper run of the conveyor together with an aligning stop for the leads which are supported by the work holders.

Fig. 12A is a sectional view on line 12A—12A of Fig. 12.

Fig. 13 is a plan view of the work holder shown in section in Fig. 12.

Fig. 14 is a top view of the stud holder.

Fig. 15 is a side view looking in the direction of arrow 15 of Fig. 14.

Fig. 16 is a view in the direction of arrow 16 of Fig. 15.

Fig. 17 is a plan view of the frame which supports the lead and which supports the stud work holder.

Fig. 18 is a view in the direction of arrow 18 of Fig. 17.

Fig. 19 is a view in the direction of arrow 19 of Fig. 18.

Fig. 20 is a view similar to Fig. 10 but is on a larger scale and shows more parts.

Fig. 21 is a fragmentary sectional view on line 21—21 of Fig. 20.

Figure 22:
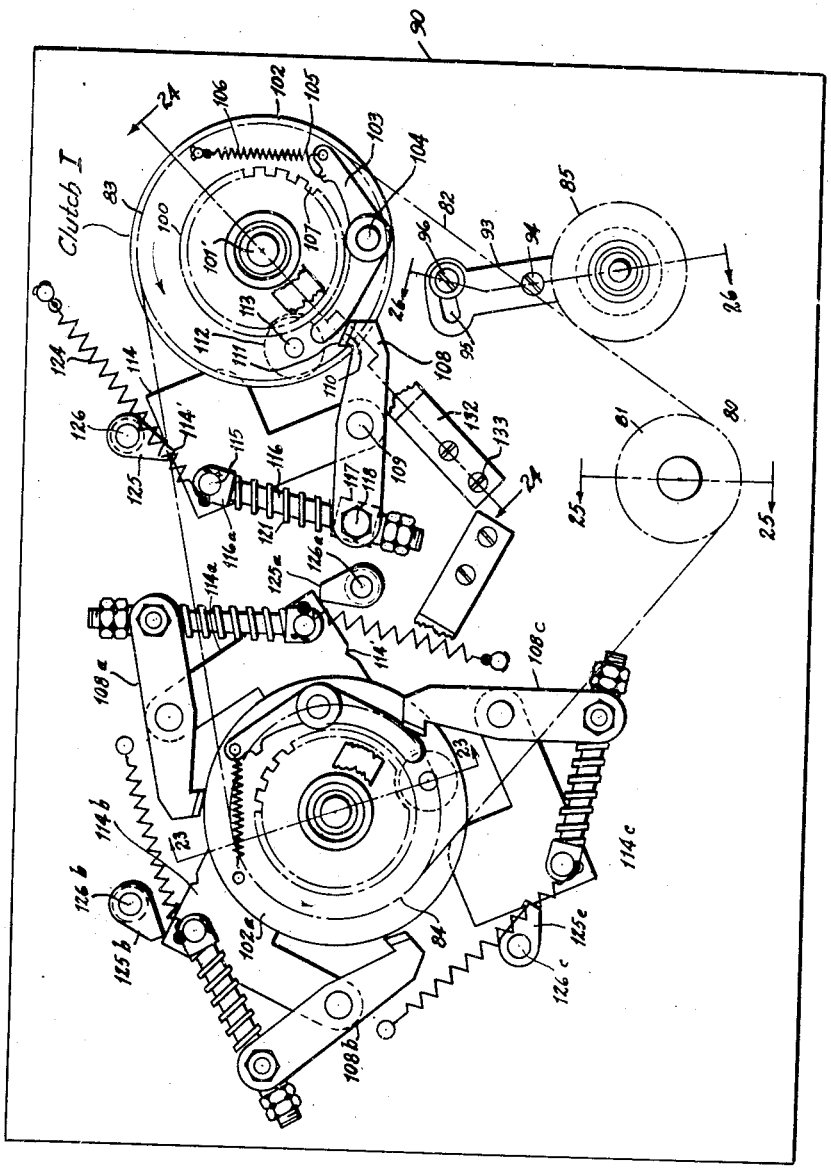
Fig. 22 is a fragmentary end view in the direction of arrow 22 of Fig. 8.
Figure 23:
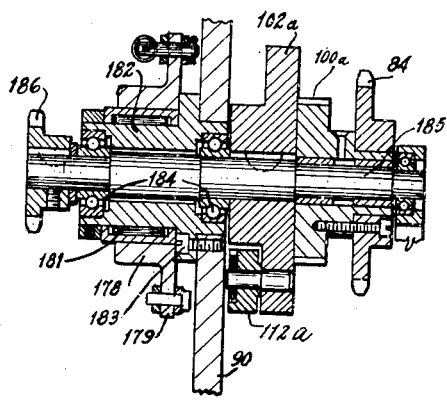

Figs. 23, 24, 25 and 26 are sectional views taken respectively on lines 23—23, 24—24, 25—25 and 26—26 of Fig. 22.

Fig. 27 is a fragmentary longitudinal sectional view on line 27—27 of Fig. 28 showing the left end of the clutch control mechanism of which Fig. 21 is a portion of the right end.

Fig. 28 is a sectional view on line 28—28 of Fig. 27.

Fig. 29 is a fragmentary sectional view on line 29—29 of Fig. 28.

Fig. 30 is a fragmentary sectional view on line 30—30 of Fig. 28.

Fig. 31 is a side view of the stud hopper feed.

Fig. 32 is an end view in the direction of the arrow 32 of Fig. 31.

Fig. 33 is a fragmentary sectional view on line 33—33 of Fig. 31 and is double the scale of Fig. 31.

Fig. 34 is a sectional view on line 34—34 of Fig. 31.

Fig. 35 is a sectional view on line 35—35 of Fig. 31.

Fig. 36 is a sectional view on line 36—36 of Fig. 31. (Figs. 33 through 36 are double the scale of Fig. 31.)

Fig. 37 is an enlargement of that portion of Fig. 31 within the dot-dash circle 37.

Fig. 38 is a sectional view on line 38—38 of Fig. 31, and is drawn to the same scale as Fig. 37.

Fig. 39 is a view in the direction of arrow 39 of Fig. 37.

Fig. 40 is a view in the direction of arrow 40 of Fig. 39.

Fig. 41 is a sectional view on line 41—41 of Fig. 39.

Fig. 42 is a sectional view on line 42—42 of Fig. 37, and shows in dot-dash lines a portion of the stud transfer mechanism.

Fig. 43 is a perspective view showing the lower end of the stud hopper feed, the stud transfer mechanism and the conveyor.

Fig. 44A is a fragmentary view in the direction of arrow 44A of Fig. 43.

Fig. 44B is a fragmentary sectional view on line 44B—44B of Fig. 43.

Fig. 45 is a fragmentary side view of the transfer mechanism looking in the direction of arrow 45 of Fig. 43 and shows the conveyor rails in section.

Figs. 46 and 47 are views similar to Fig. 45 showing parts of the transfer mechanism in different positions.

Fig. 48 is a view in the direction of arrow 48 of Fig. 45.

Fig. 49 is a sectional view on line 49—49 of Fig. 6 and shows the cam operated mechanism associated with parts shown in Fig. 45.

Fig. 50 is a view in the direction of the arrow 50 of Fig. 49.

Fig. 51 is a view in the direction of the arrow 51 of Fig. 50.

Fig. 52 is a fragmentary sectional view on the line 52—52 of Fig. 50.

Figure 53:
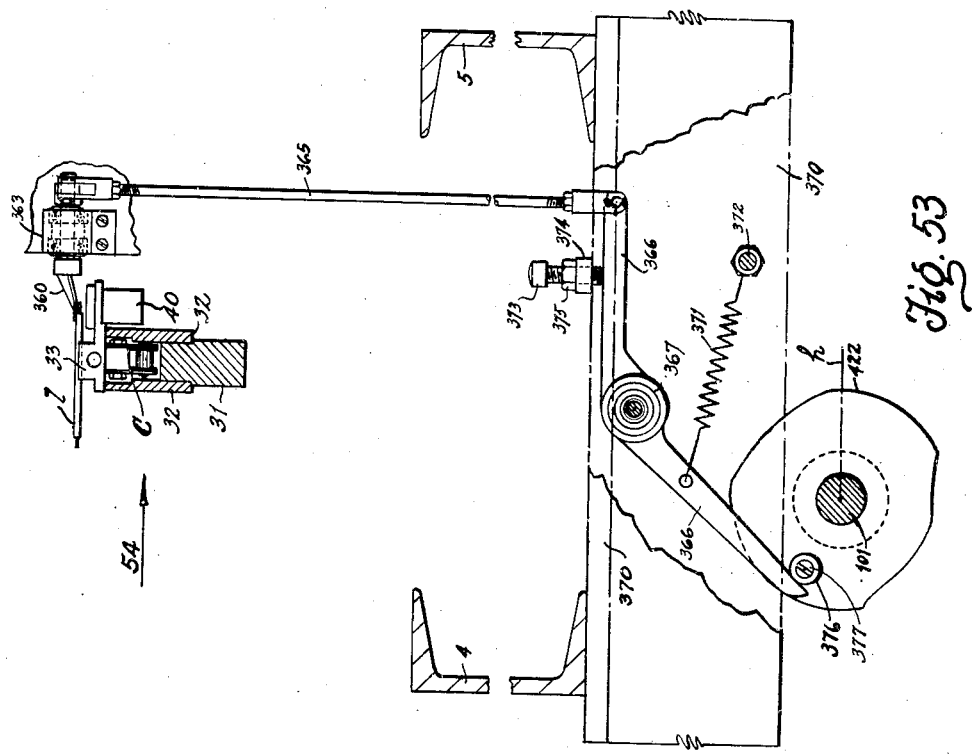

Fig. 53 is a fragmentary sectional view on the line 53—53 of Fig. 6, and shows a cam operated mechanism for operating a lead bender before the studs are placed in the work holders of the conveyor.

Figure 54:
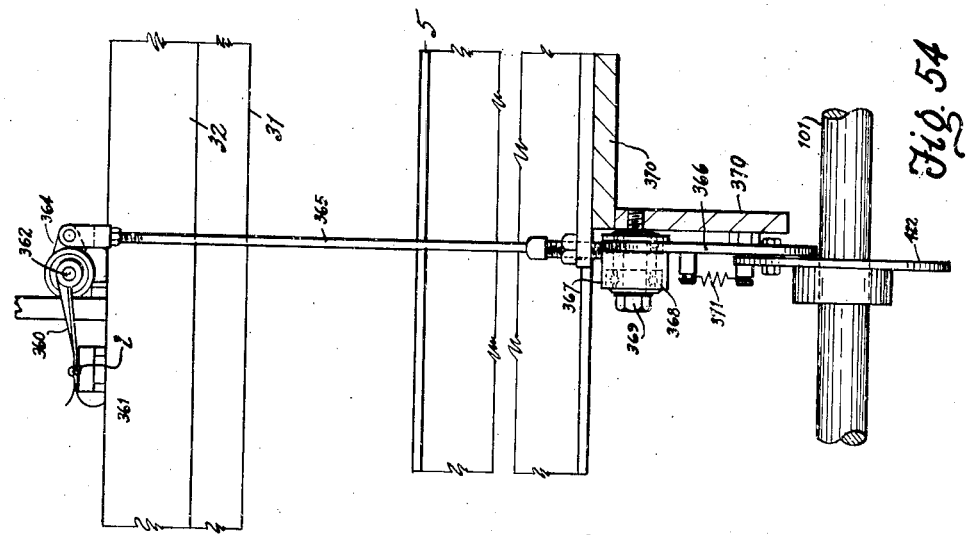

Fig. 54 is a view in the direction of arrow 54 of Fig. 53.

Figure 55:
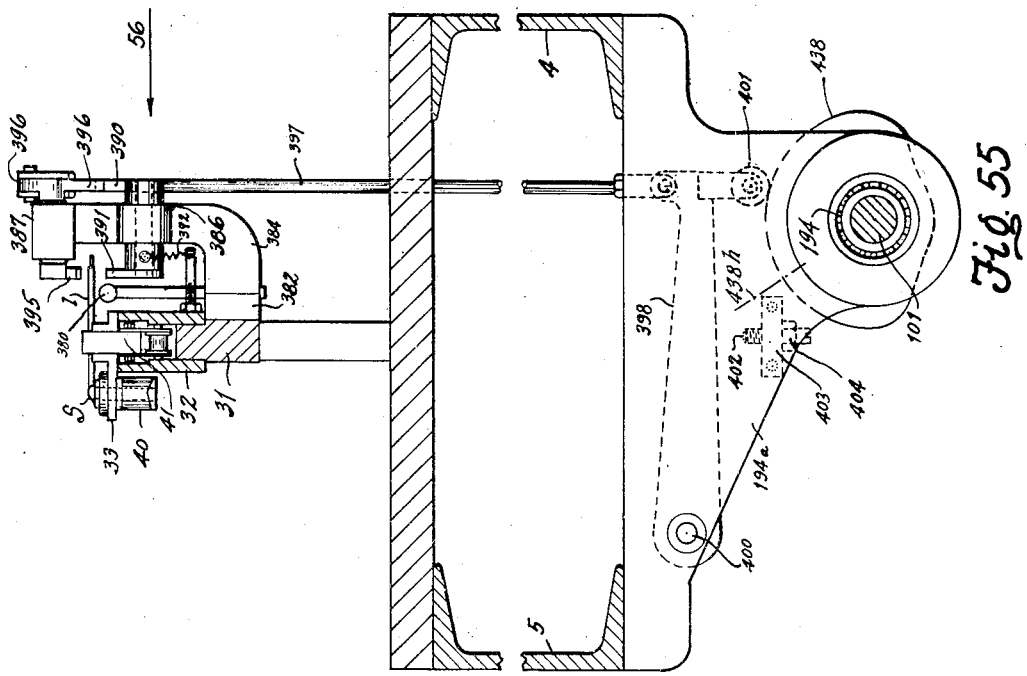

Fig. 55 is a fragmentary sectional view on line 55—55 of Fig. 6, and shows the cam operated mechanism for operating a lead bender after the studs have been placed in the work holders of the conveyor.

Figure 56:
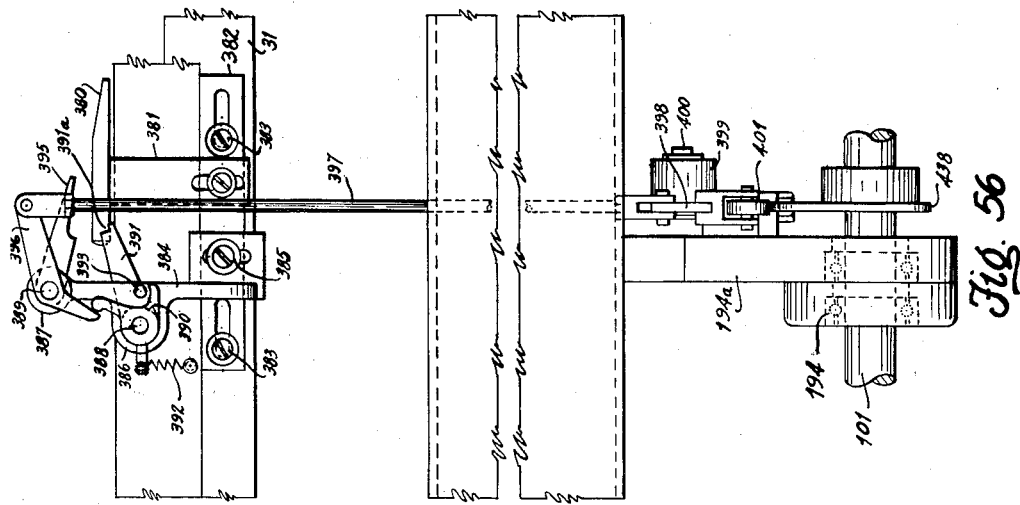

Fig. 56 is a view looking in the direction of arrow 56 of Fig. 55.

Figures 57, 58:
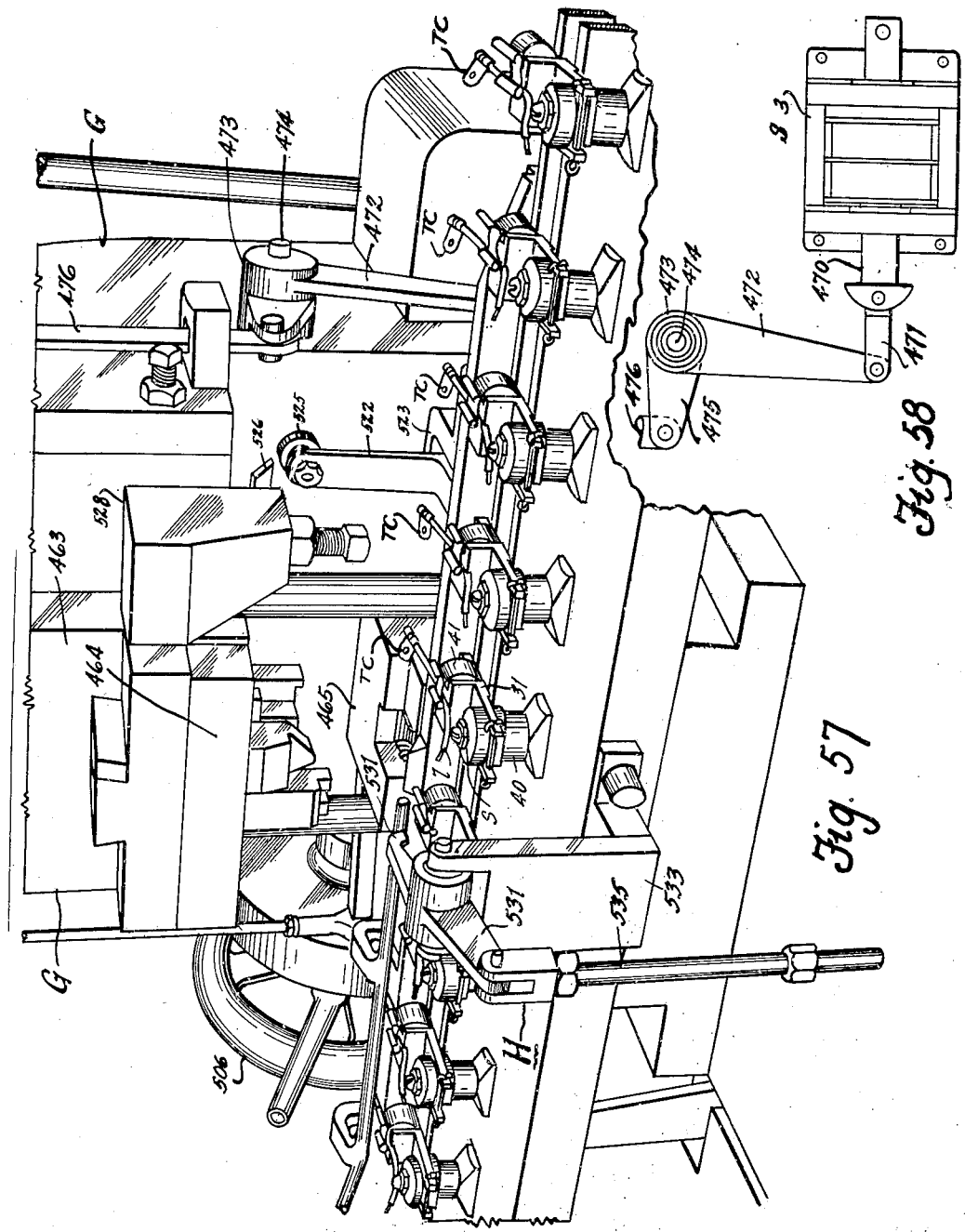

Fig. 57 is a fragmentary perspective view of the punch press.

Fig. 58 is a diagram of the punch press control solenoid S3 and mechanical connections therewith.

Figure 59:
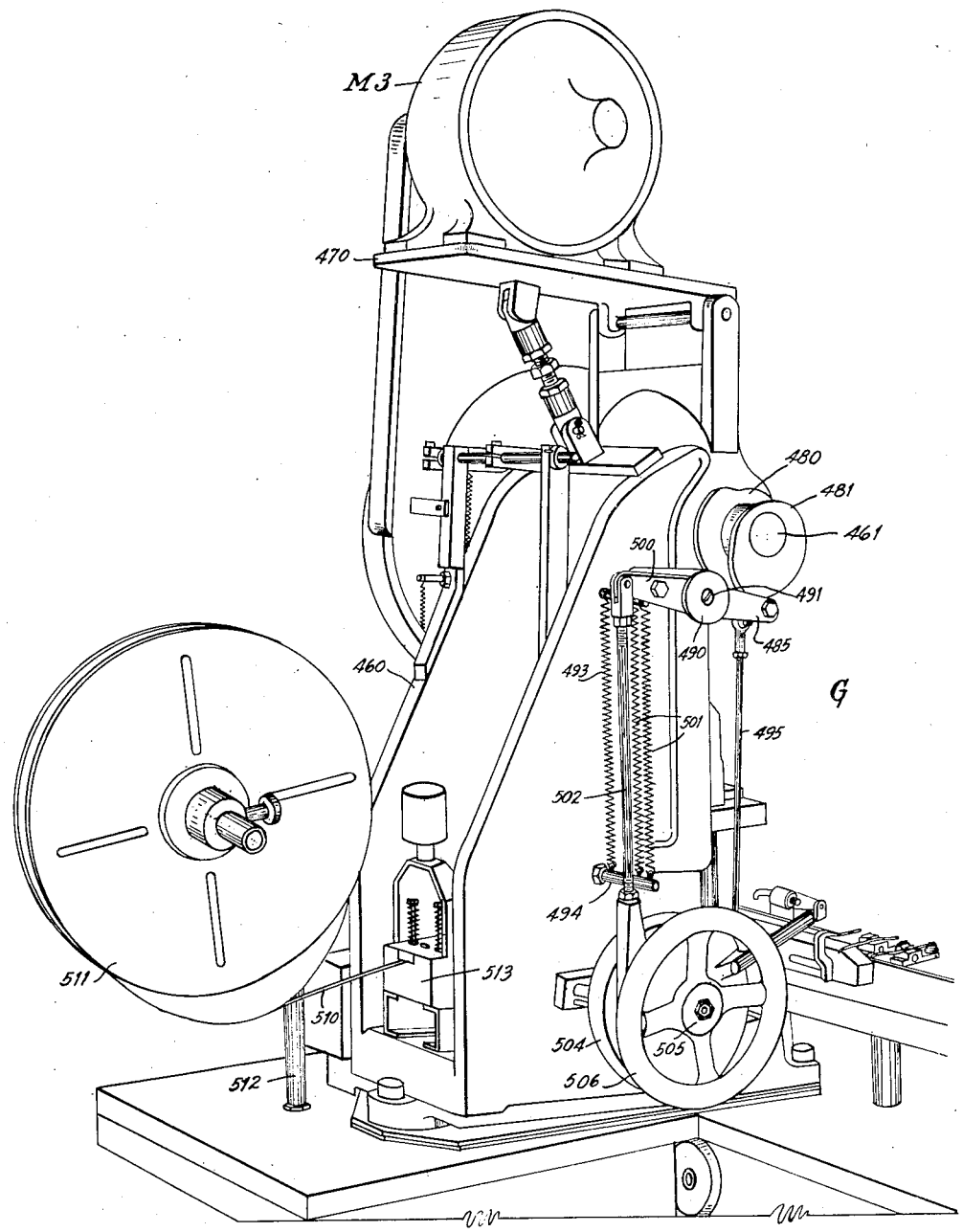

Fig. 59 is a perspective view of the punch press as viewed in the direction opposite to that in which Fig. 57 is viewed.

Fig. 60 is a fragmentary side view of the punch press and shows some of the mechanism seen in Fig. 59.

Fig. 61 is a view in the direction of the arrow 61 of Fig. 60.

Fig. 62 is a sectional view on the line 62—62 of Fig. 61.

Fig. 63 is a fragmentary sectional view on lines 63—63 of Fig. 6 (two places), and shows the cam operated mechanisms for a feeler H associated with the punch press and for a feeler K associated with a welder.

Fig. 64 is a view in the direction of arrow 64 of Fig. 63.

Fig. 65 is a view in the direction of arrow 65 of Fig. 6, and shows the lead locator at the punch press.

Fig. 66 is a view on the line 66—66 of Fig. 65.

Fig. 67 is a view in the direction of arrow 67 of Fig. 66.

Fig. 68 is a sectional view on line 68—68 of Fig. 67.

Fig. 69 is a sectional view on the line 69—69 of Fig. 6, and shows the cam operated lead locator associated with the first welder J.

Fig. 70 is a view on line 70—70 of Fig. 69.

Figs. 71, 72, 73 and 74 are sectional views taken respectively on the lines 71—71, 72—72, 73—73 and 74—74 of Fig. 70.

Fig. 75 is a perspective view in the direction of arrow 75 of Fig. 72, showing a portion of the second welder M and a feeler and stud turning device L associated therewith.

Fig. 76 is a view in the direction of arrow 76 of Fig. 75.

Fig. 77 is a view in the direction of arrow 77 of Fig. 75.

Fig. 78 is a fragmentary sectional view on line 78—78 of Fig. 6, and shows a cam operated mechanism for operating a stud turning device L.

Fig. 79 is a top view of the feeler and stud turning device L and is looking in the direction of arrow 79 of Fig. 78.

Fig. 80 is a sectional view on line 80—80 of Fig. 78.

Fig. 81 is a fragmentary sectional view on the line 81—81 of Fig. 78.

Fig. 82 is a fragmentary side view partly in section of the feeler and stud turning device L shown in Fig. 79 and is in the direction of arrow 82 of Fig. 79.

Fig. 83 is a view in the direction of arrow 83 of Fig. 82.

Fig. 84 is a view in the direction of arrow 84 of Fig. 83.

Fig. 85 is a sectional view on a larger scale than Fig. 82 and is taken on the line 85—85 of Fig. 82.

Fig. 86 is a fragmentary sectional view on the line 86—86 of Fig. 85.

Fig. 87 is a fragmentary sectional view on line 87—87 of Fig. 85.

Fig. 88 is a sectional view on the line 88—88 of Fig. 6, and shows the cam operated mechanism for operating the lead locator N for the welder M.

Fig. 89 is a view in the direction of the arrow 89 of Fig. 88.

Fig. 90 is a sectional view on line 90—90 of Fig. 6, and shows a work ejecting mechanism.

Fig. 91 is a side view partly in section looking in the direction of the arrow 91 of Fig. 90.

Fig. 92 is an enlarged detail of the ejector shown in Fig. 91.

Fig. 93 is a sectional view on the line 93—93 of Fig. 6, and shows a cam operated mechanism for positioning an air nozzle to blow out a stud from the work holder when the ejector shown in Figs. 90, 91 is operating.

Fig. 94 is a view in the direction of the arrow 94 of Fig. 93.

Fig. 95 is a sectional view on the line 95—95 of Fig. 6, and shows a cam operated mechanism for operating the air valve which controls the air blast through a nozzle shown in Fig. 93.

Fig. 96 is a view in the direction of arrow 96 of Fig. 95.

Fig. 97 is a fragmentary view in the direction of arrow 97 of Fig. 8, showing the top view of the safety switch operating mechanism for the welder M.

Fig. 98 is a view on the line 98—98 of Fig. 97.

Fig. 99 is a sectional view on the line 99—99 of Fig. 98.

Fig. 100 is a sectional view on line 100—100 of Fig. 6, and shows cam 436 and switches SW6 and SW7 controlled thereby.

Fig. 101 is a sectional view on the line 101—101 of Fig. 6, showing cam 426 and switches SW12 and SW20 controlled thereby.

Fig. 102 is a sectional view on the line 102—102 of Fig. 6, and shows cam 428 and switches SW2 and SW9 operated thereby.

Fig. 103 shows in section cam shaft WCS of welder M and cam WC1 operated thereby and switch SW1 controlled by the cam.

Fig. 104 is a view similar to Fig. 103 showing cam WC2 operated by the welder cam shaft WCS and switches SW3 and SW22 controlled thereby.

Fig. 105 is a wiring diagram of electrical circuits used in the present invention.

Figure 106:
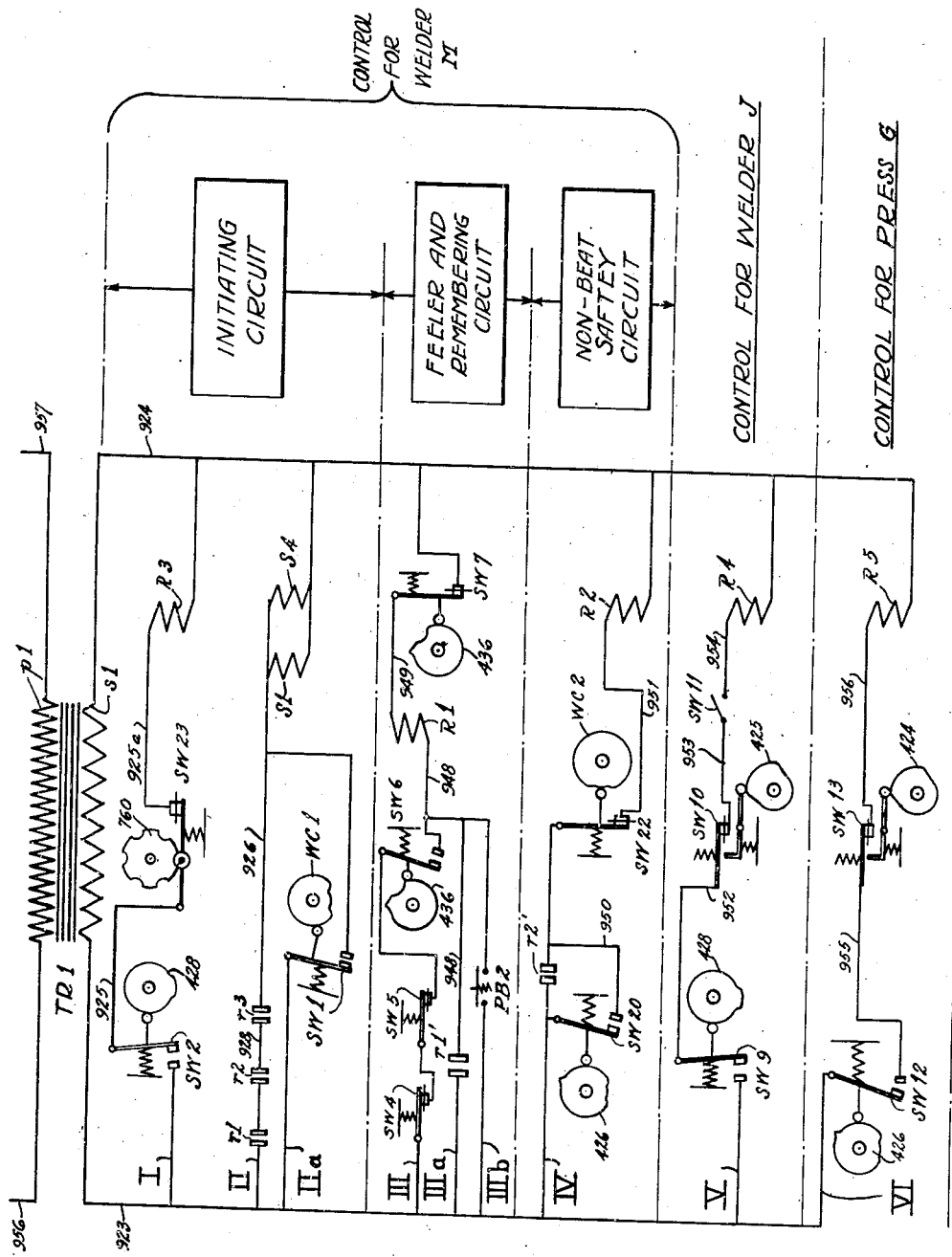

Fig. 106 is a simplified wiring diagram of certain circuits included in Fig. 105.

Figure 107:
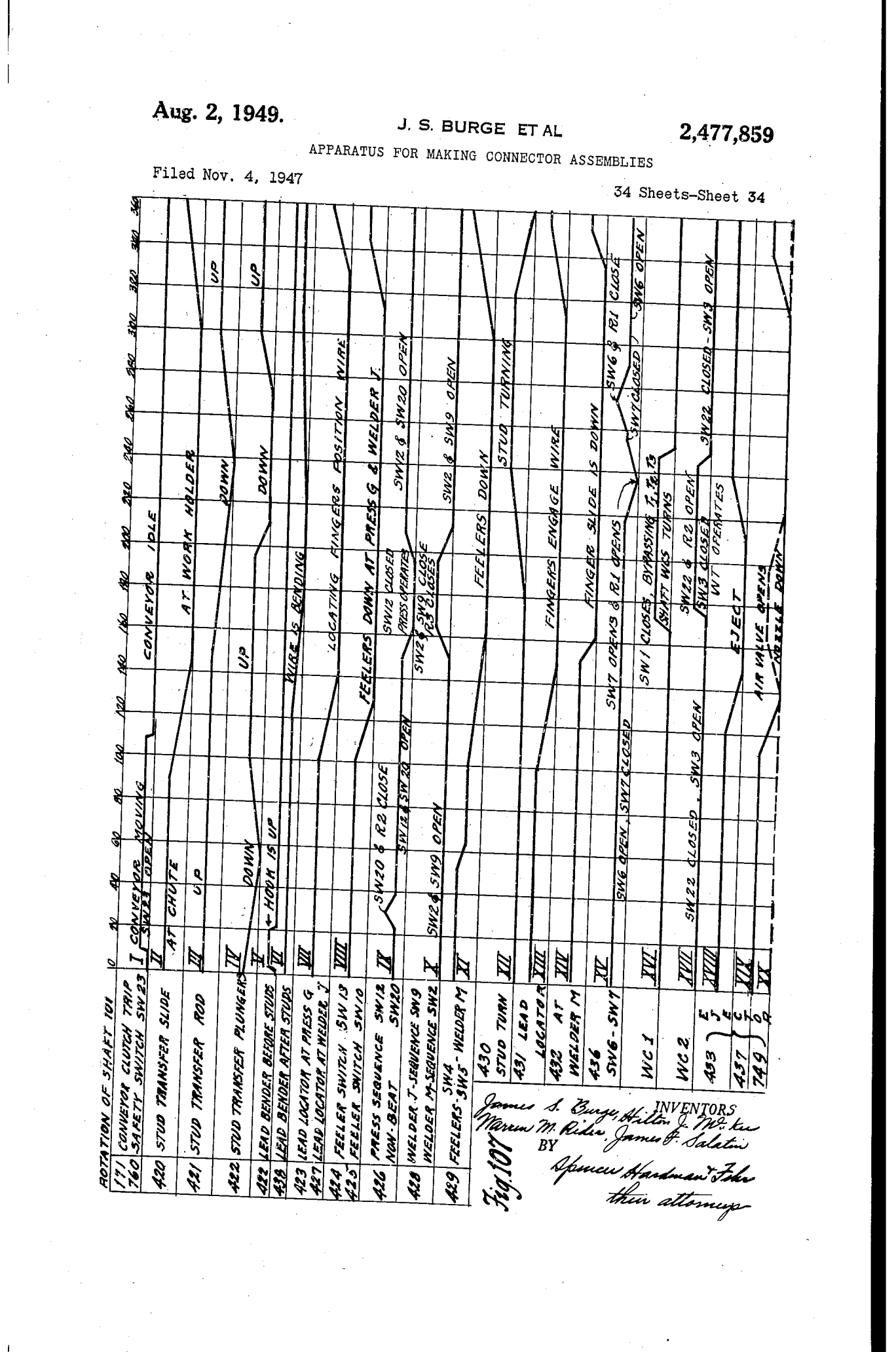

Fig. 107 is a cam timing chart.

Referring to Fig. 1, the machine comprises chiefly a plurality of work holders W provided by a chain conveyor represented by the dot-dash line C (Figs. 2 and 3) and shown in section in Fig. 12. This conveyor moves the work holder successively past the loading station at A (Fig. 1), a lead bender B (Fig. 43), a stud transfer mechanism D (Figs. 1 and 43) which transfers studs to a work holder from the chute E' of a hopper feed E, a lead bender F (Figs. 56 and 59), a punch press G (Figs. 57 and 59) provided with a feeler H (also Fig. 1), a welder J (Fig. 1) having a feeler K, a stud and lead feeling device L (Figs. 1, 75, 76 and 77) preparatory to arriving at the welder M (Figs. 1, 75, 76 and 77) having associated therewith a lead locator N (Figs. 77 and 75) and then to an ejector on the under run of the conveyor marked P in Fig. 91 having associated therewith an air blast Q (Figs. 93 and 94).

Referring to Figs. 6 and 7, a machine frame comprises legs 1, 2 and 3 which support channels 4 and 5 (see also Figs. 8, 9 and 10), and the right ends of the channels rest on a plate 6 supported by vertical plates 7 resting on a base 8 supported above the floor by a pedestal 9. The channels are tied together by rods 11 (Fig. 6) and spaced by tubes 12. The channels 4 and 5 (Figs. 2 and 3) support table plates 13, 14, 15 and 16, which are also supported by legs 17, 18, 19 and 20. Plate 13 supports hopper feed E, plate 14 supports press G and mechanism associated therewith. Plate 15 supports welder J and mechanism associated therewith. Plate 16 supports welder M and mechanism associated therewith. The welder M includes a cam shaft marked WCS in Figs. 103 and 104 driven by an electric motor (not shown) enclosed in a cabinet 21 resting on the floor.

Channels 4 and 5 support respectively bars 24 and 25 which support cross bars 26 (Fig. 7) and 28 (Fig. 6) which support a conveyor mid rib 31 which is supported also by studs 29 and plates 30. Studs 29 are carried by plates 13 and 15. Plates 30 are supported by the channels 4 and 5.

Referring to Fig. 12, mid rib 31 supports rails 32 which support, for horizontal sliding movement, a plurality of work holder frames 33 each of which is attached by a screw 34 to side plates 35 which are integral with certain conveyor chain links 36. Links 36 together with other links 37, cross pins 38 and rollers 39 constitute the conveyor C. Conveyor C moves a plurality of equidistant work holders W each comprising the frame 33, a solid copper bushing 40 which supports a stud S and a boss 33a having a notch 33b for receiving a wire lead $l$ which is retained in the notch 33b by a spring clip 41 (Fig. 12A). An operator at the loading station indicated in Figs. 9 and 43, takes the lead wire $l$ and locates it, as shown in Fig. 12, with its bare right end located against a locating block 50 attached to a block 51 attached to a plate 52 which is attached to the bars 27 and 28 (Fig. 9). The wire $l$ having thus been located the operator pushes it into the notch 33b and retains it by a clip 41. The stud S is automatically placed later in the bushing 40. The bushing 40 (Fig. 15) has a groove 42 which receives the portion 33c of part 33 (Fig. 13), the part 33c having branches 33d which define a notch into which the bushing 40 fits and the latter is retained by a cotter pin 43. Each bushing 40 provides a surface 45 contacting a fixed electrode block provided by the welder M. The clip 41, which is shaped as shown in Fig. 12A, is connected with the frame 33 by a screw 46.

The lead wires $l$ move in the path represented by line $l'$ (Figs. 8 and 9). The chain conveyor represented by the dot-dash line C (Figs. 8 and 9) passes around the left end sprocket 55 (Fig. 9) on a shaft 56, journaled in bearings supported by the channels 24 and 25 and around a right end sprocket 57 (Fig. 6) attached to a shaft 58 journaled in bearings provided by plates 59 and 60 attached to channels 4 and 5 (Fig. 10) and around an idle sprocket 61 (Fig. 6, left) mounted on a shaft 62 rotatably supported by the channels 4 and 5 and around a take-up idle sprocket 63 mounted on a bracket 64 attached to a cross plate 65 (Figs. 4 and 6), attached by screws 66 in channels 4 and 5. The weight of the chain C and the work holders is taken on the underside by antisag device 70 which comprises a mid rib 71 supported by end legs 72 which are supported by members 73, 74 and 75 which are supported by the channels 4 and 5. Mid rib 71 supports rails 76 which support work holder frame 33 in an inverted position. As the work holders enter and leave the device 70 they pass over grooved rollers 77 pivotally supported by members 78 attached to rods 79 supported by plates 76.

Figure 24:
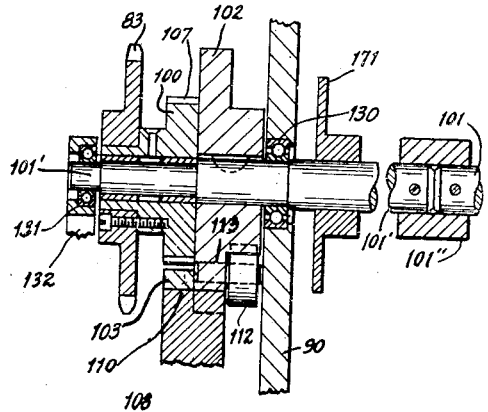
Figure 25:
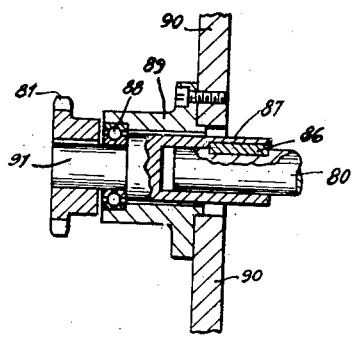
Figure 26:
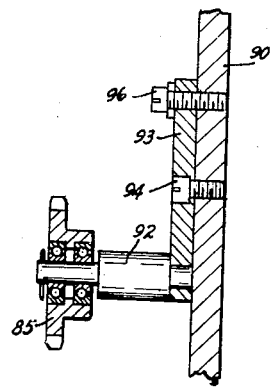

An electric motor, not shown, which rests on plate 8 (Fig. 6) drives through a gear reducer, a power shaft 80 driving a sprocket 81 connected by chain 82 (Fig. 10) with sprockets 83 and 84 and engaging an idle take-up sprocket 85. Referring to Fig. 25, shaft 80 is connected by key 86 with a stub shaft 87 journaled in a bearing 88 supported by a bracket 89 supported by plate 90. Shaft 87 is connected by key 91 with sprocket 81. The idle sprocket 85 is rotatably supported by stud 92 (Fig. 26) attached to a plate 93 pivoted on a screw 94 threaded in the plate 90 and provides an arcuate slot 95 (Fig. 22) which receives a screw 96 threaded in the plate 90. When screw 96 is loosened the slack in the chain 82 can be taken up by rotating the plate 93 on screw 94 clockwise after which the screw 96 is tightened. Referring to Fig. 24, sprocket 83 is attached to the hub of a clutch driving member 100 loosely journaled on a shaft 101'. The sprocket 83 is connected with shaft 101' by a one-revolution clutch I which includes the driving member 100, a driven member 102 keyed to the shaft 101', a latch 103 (Fig. 22) pivoted at 104 upon the member 102 and having a tooth 105 urged by spring 106 into a notch 107 in member 100 and including a clutch throwout lever 108 pivotally supported by a stud 109 carried by plate 90 and having a hook end 110 adapted to be received by a notch 111 in member 102 and adapted to engage the lever 103 when the clutch is disengaged. Movement of lever 108 into the latching position shown in Fig. 22 is effected by the engagement of a roller 112, pivoted on a pin 113 carried by the member 102, with a lever 114 pivoted on stud 109 and carrying a pin 115 by which a rod 116 is connected with member 114. Rod 116 passes through a block 117 which is pivotally connected by screw 118 with lever 108; and rod 116 receives screws 119 which limit movement of block 117 away from pin 115 by the action of a spring 121. Spring 121, which surrounds rod 116, is normally compressed between the head 116a of rod 116 and the block 117. When the roller 112 engages the lever 114 to move it counterclockwise, the spring 121 is stressed so as to urge the hook end 110 of lever 108 against the periphery of member 102 so that, when the notch 111 comes into registry with the hook 110, the lever 108 will move quickly counterclockwise to place the hook within the notch and thereby to stop rotation of the member 102 at the instant the lever 103 is disconnected from the notch 107 of the driving clutch part 100. When the lever 114 is in the position shown it will be retained thereagainst the action of a spring 124 by a pawl 125 engaging a notch 114' of lever 114. Pawl 125 is rotated by a shaft 126 in a manner to be described for the purpose of moving the lever 114 clockwise in order to move the pawl out of the notch 114' so that the spring 124 can move the lever 114 and the lever 108 counterclockwise in order to retract the latch hook 110 from the notch 111 and to permit the spring 106 to connect the parts 100 and 102 so that the clutch may be connected for one revolution. Shaft 101' is supported by a bearing 130 in plate 90 (Fig. 24) and by a bearing 131 in a bracket 132 attached by screws 133 to the plate 90. Shaft 101' is connected by a shaft coupling 101" with the main cam shaft 101.

Shaft 126 (Fig. 20) operates a lever 135 connected by an adjustable link 136 with an arm 137 integral with a hub 138 journaled on a stud 139 supported by a channel member 5. Hub 139 provides an arm 140 pivotally connected at 141 with a rod 142. Rod 142 (Fig. 27), which rests on a roller 143 pivoted on a stud 144 also supported by channel 5, is pivotally connected at 146 with a lever 147 integral with a shaft 148 journaled in bearings 149 and 150 supported by channels 5 and 4 respectively. Shaft 148 provides an arm 151 pivotally connected by a rod 152 with a pedal 153 pivotally connected at 154 (also Fig. 9) with a bracket 155 supported near the floor. Pedal 153 is urged upwardly by a spring 156 which tends to move the rod 142 to the right in Figs. 27 and 21 and thereby urges the shaft 126 clockwise in Fig. 20 or counterclockwise in Fig. 22 whereby the pawl 125 is urged toward the lever 114. When the pedal 153 is pushed down by the operator it will be held down automatically by a latch plate 160 (Fig. 28) mounted on a rod 161 which is moved by means to be described counterclockwise (Fig. 29) over a lever 162 provided by shaft 148, said lever 162 having been moved below the latch plate 160 when the pedal 153 was depressed. The rod 161 is supported in bearing bushings 163 supported by a bracket 164 attached to the side plate 25. Shaft 161 is urged clockwise by a tension spring 165 connecting a stud 166 with a pin 167 fastened to a lever 168 attached to shaft 161. At the time pedal 153 has been pushed down so that lever 162 (Fig. 28) is below latch bar 160 the latter will be in the position 160' indicated in dot-dash lines and the lever 168 will be in the position 168' indicated in dot-dash lines (Fig. 30). When the operator desires to unlatch the pedal so that the spring 156 can pull it up in order that clutch I will be disconnected, the operator pushes on a handle 170 in the direction of arrow 170 thereby effecting counterclockwise rotation of the parts 160 and 168 from the dot-dash line positions to the full line positions whereby the lever 162 is unlatched and the spring 156 is free to restore the parts into the position shown whereby the latch pawl 125 (Fig. 22) will be restored under spring pressure to engagement with the lever 114 whereby the clutch I will disengage automatically at the end of one revolution. However, so long as the pedal 153 remains down the clutch I will remain in engagement and the cam shaft 101 will continue rotating. Counterclockwise movement (in Fig. 30) of shaft 161 carrying parts 160 and 168 is limited by the engagement of the lever 168 with a screw 168a supported by a bracket 168b attached to channel 4.

The sprocket 84 (Fig. 23) is drivingly connected with the driving member 100a of one-third revolution clutch II whose parts are indicated by the same reference numerals with suitable affixed letter. In the case of this one-third revolution clutch there are three latching levers 108 which are marked 108a and 108b and 108c. Other parts are similarly marked.

Shaft section 101' operates a cam 171 (Fig. 24) having a single lobe 172 (Fig. 20) engaging a roller 173 pivotally supported by a lever 174 pivotally at 175 by plate 90. Lever 175 is connected by link 176 with a lever arm 177 integral with a hub 178 having three arms 179 connected by links 180 with levers 135a, 135b and 135c connected respectively with pawl supporting shafts 126a, 126b and 126c which are connected respectively with the latch pawls 125a, 125b and 125c which respectively engage the notches 114' of levers 114a, 114b and 114c respectively. The hub 178 carries a needle bearing 181 (Fig. 23) journaled on a sleeve 182 fixed by screws 183 to plate 90 and providing bearings 184 for shaft 185 to which the driven clutch member 102a of the clutch II is attached. For each revolution of the cam shaft 101 and its connecting shaft 101', cam lobe 172 engages roller 173 thereby momentarily rotating all of the latch pawls 125a, 125b and 125c clockwise (Fig. 22) to allow the clutch II to be engaged and rotation of the shaft 185 continues for one-third revolution of the sprocket 84. Therefore, during each machine cycle, there is one revolution of the cam shaft 101 and one-third revolution of the shaft 185. During the one-third revolution of shaft 185, the conveyor work holders are moved a distance equal to the linear spacing between the work holders. To accomplish this the shaft 185 (Fig. 10) is connected with a sprocket 186 which drives a chain 187 which drives a sprocket 188 connecting with a shaft 189 which drives a bevel gear 190 meshing with a bevel gear 191 (Fig. 2). Gear 191 drives the shaft 58 (see also Fig. 10). The ratios of the gearing are such that during each one-third revolution of the shaft 185 the conveyor chain C moves linearly the distance of the spacing between work holders.

The cam shaft 101 is rotatably supported by a bearing 193 (Fig. 6) supported by a cross bar 193a supported by leg 1, by a bearing 194 in a bracket 194a carried by the channels 4 and 5, by a bearing 195 in a bracket 195a supported by channels 4 and 5, by a bearing 196 supported by a plate 198 forming the left end wall of the chamber which encloses the electric motor.

Line I of Fig. 107 shows the movement of the conveyor in relation to rotation of shaft 101 from the start position of the shaft when clutch I first engages.

*Stud hopper feed*

The studs S, shown in Fig. 12, are supplied from a hopper 200, (Figs. 31 and 32), which is supported, as shown in Fig. 36, by a plate 201 attached to a bar 202 attached to plate 13, a plan view of which is shown at the left of Fig. 2. Referring to Fig. 35, rails 203 are attached to plate 201 and guide agitator 204 carrying a pin 205 which provide the pivotal connection for the hub 206 of a link 207 which, as shown in Fig. 31, is connected by pin 208 with a crank disc 209 connected with a shaft 210 rotatably supported by a bearing bracket 211 attached to plate 209. Shaft 210 is connected by a pulley 212 and a belt 213 with a pulley 214 which is driven by an electric motor M2 through a speed reducer 215 which also drives a pulley 216 connected by a belt 217 with a pulley 218 connected with a pulley 219 which drives a belt 220 connected with a pulley 221. Pulleys 218 and 219 are journaled on a rod 222 provided by a bracket 223 attached by screws 224 to the rails 203 and to the plate 201 and attached by screws 225 to a chute 226 which is U-shaped in cross section as shown in Fig. 38. Chute 226, which provides a track for the studs S which descend shank down from the hopper, is supported by the plate 201, the upper end of the plate 201 being shaped to provide a portion of the chute 206 which is cut away as shown in Fig. 36 in order to fit into the plate 201.

The bracket 223 provides a post 230 of channel-shaped section (Fig. 34) which receives a bar 231 which supports a bearing bracket 232 supporting bearings 233 (Fig. 33) for a shaft 234 with which the pulley 221 is connected. The shaft 234 drives discs 235, 236 and 237 in a counterclockwise direction as indicated by arrow 238 (Fig. 33A) when viewed in the direction of arrow 239 of Fig. 33. Discs 235 and 237 are of the same diameter and disc 236 is smaller in diameter as shown in Fig. 33A. These discs are so arranged that studs S can pass shank down through the channel provided by the chute 226, but all other studs which attempt to slide down upon the track 226 in any other manner will be thrown back by the teeth 240 provided by these discs. The location of the discs relative to the bar 226 is adjusted by moving the bar 231 relative to the post 230 and then securing the bar in adjusted position by tightening screws 241 which clamp the bar to the post. The studs, which are thrown back into the hopper by the toothed discs, mingle in with others which are agitated by the agitator 204 and some of these are caught by the beveled surface 204a thereof and are tossed upon the chute 226 and the chute extension 226a provided by the plate 201.

Several of the studs S, which slide shank down upon the bar 226, are shown in Fig. 43. Since it is desirable that these studs be passed singly to the lower end of the chute 226, a feeding mechanism is provided which comprises a lever hub 245 integral with arms 248 and 250 and journaled on a pin 246 supported by a bracket 247 attached to chute 226. A spring 249 urges arm 248 counterclockwise as viewed in Fig. 44A until the other arm 250 engages a stop screw 251 threaded into the chute 226. Arm 250 carries a stop lug 252 which engages the head of a stud S, as shown in Fig. 44A. In order to move the arm 250 so that its lug 252 will free a stud, a lever 253 is provided; and, by a mechanism to be described, this lever is caused to move in the direction of the arrow-headed-line 254 (Fig. 44B). Lever 253 carries a pin 255 which moves between the shanks of the studs S and engages a pin 256 carried by arm 250. As lever 253 moves down as viewed in Fig. 44B, the pin 255 passes between the shanks of the last and next to the last stud near the lower end of the chute 226 and then the pin 255 engages pin 256 to cause arm 250 to move clockwise to cause its lug 252 to release the lowermost stud S while movement of the preceding stud S down the chute 226 is prevented by engagement of its shank by the pin 255. During movement of the lever 253 up as viewed in Fig. 44B, arm 250 moves to the position shown in Fig. 44A before pin 255 is retracted from the shank of a stud.

Fig. 43 shows a stud retaining bar 260 located above the heads of the studs so as to limit the rising thereof above the chute 226. Bar 260 is supported by chute 226 in the manner shown in Fig. 38. A screw 261 secures bar 260 and a spacer 262 to a bracket 263 which a screw 264, passing through a bushing 265 (located in a slot 263a in bracket 263), secures to the chute 226 in the desired position of adjustment.

The stud S, released by the lug 252 of lever 250, slides down the chute 226 until it touches a gate 270 which is guided for horizontal movement by bracket 271 which screws 272 (Fig. 37) attach to the chute 226 and by a cover plate 273 which screws 274 attach to the bracket 271. The gate 270 is urged into stud retaining position by a spring 275 which surrounds a strip 276 which can move through an opening 277 in a plate 278 attached by a screw 279 to the bracket 271. The head 276a of strip 276 surrounds a pin 280 attached to the gate 270 and extending through a slot 281 in the plate 273. By means to be described, the pin 280 is caused to move right in order to retract the gate 270 from the stud at the bottom of the chute 226 whereupon the stud gravitates against the extension 273a of the cover plate 273. A stud S is shown in this location in Fig. 42 and is ready to be transferred to the conveyor by mechanism now to be described.

Stud transfer mechanism

Referring to Figs. 45 through 52 the stud transfer mechanism comprises a bracket 290 mounted on the channels 4 and 5 and supporting a plate 291. Plate 291 supports bars 292 which guide for horizontal movement a slide 293 having a vertical slot 293a which receives a pin 294 carried by a lever 295 pivotally supported at 296 by the bracket 290 (Fig. 49). A link 297 (Fig. 52) connects lever 295 with a lever 298 pivoted at 299 on a bracket 300 supported by a plate 301 supported by channels 4 and 5. Lever 298 carries a roller 302 for engaging a cam 420 driven by the cam shaft 101. Lever 295 is urged clockwise and lever 298 counterclockwise by a spring 303 connecting lever 295 with plate 301. Cam 420 rotates counterclockwise as indicated by arrow 304 when looking in the direction of arrow 305 of Fig. 50.

Cam 421 also driven by shaft 101 engages a roller 310 carried by a lever 311 pivoted at 312 on a bracket 313 carried by plate 301 and connected by a link 314 with the lever 253 described with reference to Figs. 44A and 44B. Lever 253 is connected with a shaft 315 journaled in a bearing bracket 316 and connected as shown in Fig. 51 with a lever 317 which a link 318 connects with a lever 319 attached to a shaft 320 rotatably supported by the bracket 291. Shaft 320 (Fig. 49) is connected with a lever 321 carrying a pin 322 received by a horizontal slot 323 (Fig. 45) in a cap 323a connected with the upper end of a rod 324 which is slidable through a sleeve 325 guided by a tube 326 integral with bracket 291. The sleeve 325 has a grooved collar 327 which receives a pin 328 carried by a lever 329 connected with a shaft 330 pivotally supported by the bracket 291. Shaft 330 (Fig. 51) is connected with a lever 331 which a link 332 connects with a lever 333 pivoted at 334 on a bracket 335 supported by plate 301. Lever 333 carries a roller 336 for engaging a cam 422 driven by shaft 101. As viewed in Fig. 51, which is in the direction of arrow 51 of Fig. 50, the cam 422 rotates clockwise as indicated by arrow 337. Engagement of the roller 336 with the cam 422 is effected by a spring 338 connecting lever 331 with channel 5. Engagement of roller 310 with the cam 421 is effected by spring 339 connecting lever 317 with plate 301.

Referring to Fig. 46, plate 293 carries screws 340 and 341 pivotally supporting levers 342 and 343 urged together by a spring 344 connecting the levers, said movement of the levers being limited by pins 345 engaged by lugs 346 of the levers. Levers 342 and 343 have stud engaging fingers 342a and 343a, respectively, which are caused to separate by engagement of these levers herewith by a plunger 350 connected by pin 351 with lever 329 or by engagement of the levers 342 and 343 by the plunger 325. When the slide 293 is in the position shown in Fig. 46 and lever 329 has not yet moved down, the fingers 342a and 343a will be in closest relation. At that time the surface of 342a of lever 342 will be relatively close to the pin 280 which opens the gate 270 (Fig. 41). Downward movement of lever 329 causes downward movement of plunger 350 (Fig. 46) to cause separation of the fingers 342a and 343a and engagement of the lever surface 342b with the pin 280 to cause it to move in a direction which is left in Fig. 46 and is right in Fig. 39. Therefore the pin 280 moves to the position shown in Fig. 42 and the gate is retracted to the position 270' (Fig. 42) thereby allowing stud S to move against the plate 273 (Fig. 41) in which position the shank of the stud S is located between the separated fingers 342a and 343a (Fig. 46). Then the lever 329 moves up and the spring 342 causes the fingers 342a and 343a to move together and to engage the shank of the stud S. Then the slide moves right into the position shown in Fig. 45 and the stud S is carried to a position in vertical alignment with the hole in the stud carrier 40. At that time the conveyor C is at rest. Then the lever 329 moves down again into the position shown in Fig. 47 to cause the sleeve 325 to move down and to engage the levers 342 and 343 to cause their respective fingers to release the stud and coincidentally therewith the lever 321 moves down to cause the rod 324 to move down to engage the stud if it is not already moved down into the work holder 40. Then the levers 321 and 329 move up and the conveyor is indexed. During downward movement of lever 321, shaft 315 is turning counterclockwise in Fig. 51 and clockwise in Fig. 49. Therefore coincidentally with downward movement of lever 321, the lever 253 moves clockwise so that its upper end moves down in Fig. 44B to effect the release of a stud S as has been described.

Lines II, III and IV of Fig. 107 show the functions of cams 420, 421 and 422, respectively, in relation to rotation of shaft 101. In the drawings which show the contours of the cams referred to by numbers between 420 and 438, both inclusive, there appear lines marked $h$ preceded by the number of the cam on which the line $h$ appears. The $h$ line is the home position line of the cam. For example, when shaft 101 is at its home or start position, line 420$h$ will intersect the point of engagement of cam 420 with its follower roller.

Lead bender before loading stud

Referring to Figs. 53 and 54, as the conveyor C moves, the lead $l$ is pulled away from the work holder 40 by a lever 360 having a hook 361 and attached to shaft 362 rotatably supported by a bracket 363 and carrying an arm 364 which a link 365 connects with a lever 366 having a hub 367 journaled on bearings 368 supported by screw 369 threaded into a bracket 370 supported by channels 4 and 5. A spring 371 connecting the lever 366 with the stud 372 on bracket 370 urges the lever 366 counterclockwise against an adjustable stop screw 373 threaded through a lug 374 on the bracket 370 and secured in adjusted position by lock nut 375. Lever 366 is located in the path of movement of roller 376 journaled on a pin 377 attached to the cam 422 previously described and as viewed in Fig. 53, the cam 422 rotates counterclockwise to cause the lever 366 to move clockwise to bring the lever 360 into the path of movement of leads $l$ so that the hook 361 will engage the lead $l$ to cause it to be bent away from the stud holder 40 as it moves toward the left in Fig. 54, whereby a stud can be deposited in it without interference by the lead. As the lead $l$ moves to the stud transfer station it engages a guard 378 (Fig. 43) which pushes it down so that the hook 361 of lever 360 can engage it. Guard 378 is integral with a bracket 379 attached to conveyor mid-rib 31.

Line V of Fig. 107 shows that the hook 361 moves up before the conveyor starts in order to release the lead $l$ which the hook had bent; and the hook 361 moves down after the conveyor starts so as to be in position to engage the next lead $l$.

Lead bender after a stud is loaded

It is desirable that the right end of lead $l$ (Fig. 55) be bent downwardly upon a rod 380 in order that the bared end at the right will be in a better position to receive a terminal clip to be attached thereto. For this purpose the mechanism shown in Figs. 55 and 56 is provided. The rod 380 is attached to the upper end of bar 381 connected with a bar 382 which can be secured by screws 383 to the bar 31 in the desired position of horizontal adjustment. The bar 382 supports a bracket 384 which can be adjusted vertically and secured to the bar 382 by a screw 385. Bracket 384 provides tubular bosses 386 and 387 which support respectively shafts 388 and 389. Shaft 388 is connected with levers 390 and 391; and it is urged counterclockwise (Fig. 56) by a spring 392 so that lever 391 is urged counterclockwise until it engages a stop pin 393 supported by bracket 384. Shaft 389 is connected with levers 395 and 396, the latter being engageable with the lever 390. Lever 396 is connected by link 397 with a lever 398 whose hub 399 is journaled on a pin 400 supported by a bracket 194a attached to channels 4 and 5. (See also Fig. 6.) As previously described, bracket 194a supports a bearing 194 for shaft 101 which drives a cam 438 engageable with a roller 401 carried by a lever 398. When the low land of cam 438 is adjacent the roller 401 the lever 398 gravitates against an adjustable stop screw 402 threaded through a block 403 attached to bracket 194a and secured in the desired position of adjustment by a lock nut 404. When the cam 438 is located as shown in Fig. 55, the various levers are held up as shown in Figs. 55 and 56. When the cam 438 permits the lever 398 to move down, lever 395 moves down to engage the lead $l$ while the lever 391 moves up to engage it. Therefore, the lead is bent around the rod 380 and into the notch 391a of lever 391.

Line VI of Fig. 107 shows in relation to rotation of shaft 101 the operation of cam 438 in causing the lead wire to be bent.

After the lead is thus bent, the parts are returned by cam 438 to the positions shown in Figs. 55 and 56; and, while the roller 401 is on the high land of the cam, the conveyor is indexed. Then the leads pass to the punch press where a terminal clip is formed and is attached to the lead. Fig. 57 shows terminal clips TC attached to leads which have passed the punch press G.

Lead locator for the punch press G

As the conveyor is indexed the leads move in the direction of arrow 410 (Fig. 66). The leads pass between rod 411 carried by brackets 412 and a bar 413. Bracket 412 is supported by bar 413 and the latter by brackets 414 supported by conveyor bar 31. To locate the lead $l$ as shown in Fig. 66, it is pushed against a block 415 by a locating finger 416 at the end of a lever 417 which, as shown in Fig. 68, has a bifurcated right end carrying a pin 418 received by notch 419 in the upper end of a lever 440 which is journaled on a rod 441 supported by the channels, one of which is at 5 in Fig. 65. Lever 440 is connected by a link 442 with a lever 443 pivotally supported at 444 on a bracket 445 attached to channel 5 and carrying a roller 446 for engaging a cam 423 driven by a shaft 101. Springs 447 connecting lever 443 with plate 14 urge lever 443 clockwise (Fig. 65) and urge lever 440 counterclockwise (Fig. 66). A spring 448 (Fig. 63) connects levers 417 and 440 and urges lever 417 against a roller 450 pivoted on a pin 451 supported by bar 413.

Therefore, when the high land of cam 423 is against the roller 446, lever 443 will be moved counterclockwise and lever 440 clockwise to move lever 417 toward the right thereby causing a surface 417a of lever 417 to be brought adjacent to roller 450 whereupon the spring 448 will cause the finger 416 of lever 417 to be lowered below the upper end of bar 413. Conversely, when the low land of cam 423 engages roller 446, the lever 417 moves into the position shown in Figs. 66 and 68 to cause the lead $l$ to be pushed against the block 415 which a spring 455 urges toward the right. The block 415 guided for horizontal movement between the surface 456 and bar 413 and a block 457 attached thereto. A pin 458 extends across the bar 413 and through a slot 459 in block 415. When the finger 416 is retracted from block 415, the spring 455 pushes the block 415 right until it is stopped by engagement of pin 458 with the left end of slot 459 in block 415.

Line VII of Fig. 107 shows in relation to rotation of shaft 101 the operation of cam 423 in locating the lead wire at the punch press.

Punch press G

The punch press G (Fig. 59) comprises a frame 460 supported by plate 14 (Fig. 59) and supporting a crank shaft 461 operating a pitman 462 (Fig. 1) pivotally connected with a slide 463 supporting an upper die assembly 464 (Fig. 57) cooperating with a lower die assembly 465. These dies cooperate to form a clip TC and to attach it to the lead $l$ in the manner shown in the copending application of Burge et al., Serial No. 686,964, filed July 29, 1946. Frame 460 (Fig. 59) supports a platform 466 supporting an electric motor M3 connected by a belt with a flywheel (not shown), connectible with the shaft 461 by a conventional clutch which is coupled by the energization of a solenoid S3 (Fig. 58) whose armature 470 is connected by link 471 with a lever 472 whose hub 473 is pivotally supported by stud 474 extending from the frame of the press. Hub 473 is integral with a lever 475 connected by a link 476 with the clutch tripping mechanism (not shown). The shaft 461 (Fig. 61) is connected with cams 480 and 481 cooperating respectively with followers 482 and 483 carried respectively by levers 484 and 485 whose hubs are journaled on ball bearings 486 and 487 respectively supported by a rod 488 screwed into the frame 460 as shown in Fig. 62. These bearings are included between shoulder 489 of rod 488 and a cap 490 attached to the rod by a screw 491. Lever 484 is connected by its hub with a lever 492 which a spring 493 connects with a stud 494 screwed into the frame 460. Lever 484 is connected by a link 495 with a lever 496 for operating a movable part of lower die 465 as described in detail in the Burge application referred to. The hub of lever 485 is integral with an arm 500 urged counterclockwise by springs 501 connecting said lever with the stud 494. Lever 500 is connected by link 502 with a crank pin 503 carried by a crank disc 504 which drives a shaft 505 which operates the stock feeding mechanism (not shown). Shaft 505 can be operated manually by wheel 506 since the disc 504 is connected with shaft 505 through a ratchet mechanism. The roll of strip 510 (Fig. 59) is carried on a reel 511 which is supported by a post 512. The stock passes through an oiler 513 before passing through the feed rolls operated by shaft 505. As details of the clip forming dies are fully

15 disclosed in the Burge application referred to no further description will be given here. It will be understood that the clips TC shown in Fig. 57 are each attached to the bared end of a lead $l$ when it is located as shown in Fig. 66.

Following the operation of attaching a clip TC to a lead $l$, it is necessary to lift the lead $l$ over the clip 415 (Fig. 66) in order that the lead can pass further toward the left in Fig. 66 which is toward the right in Fig. 57. For this purpose a finger 520 is provided. It is supported by a rod 521 and is connected with a lever 522. Rod 521 is supported by a bracket 523 and by bar 413. Finger 520 is normally held in the position shown in Fig. 66 by spring 524 connecting said finger with a bracket 414. Lever 522 supports a vertically adjustable roller 525 engaged by a lever 526 pivoted on a screw 527 supported by a bracket 528 secured to the slide 463 (Fig. 57). Lever 526 is urged counterclockwise by spring 529 connected with said lever with the bracket 528 and the lever normally engages a stop pin 530 also attached to the bracket 528. When the punch press slide 463 moves down the lever 526 will strike the roller 525 but will not move the latter because the spring 524 is more resistant to counterclockwise movement of finger 520 than the spring 529 is resistant to the clockwise movement of lever 526. Therefore, the lever 526 moves over the roller 525 and then returns to a position against the pin 530. During upward movement of the punch press slide 463 the lever 526 engages the underside of roller 525 and causes counterclockwise movement of lever 522 and 520 thereby raising the lead $l$ with clip attached above the block 415.

Feeler for the control of the punch press

After the locating mechanism shown in Fig. 66 is operated to position the lead $l$ for receiving a clip TC, the punch press clutch will be tripped and the press will go through its cycle of operation, in response to the energization of solenoid S3 (Fig. 58). This solenoid will be energized provided there is a lead $l$ on the work holder then directly in front of the press. The presence of a lead $l$ is determined by a feeler lever 531 (Fig. 63) whose hub is pivotally supported by a rod 532 supported by a plate 533 attached to a bracket 534 attached to the conveyor mid-rib 31. Lever 531 is connected by link 535 with a lever 536 whose hub is pivotally supported by rod 537 supported by bracket 538 attached to a plate 539 supported by the channels 4 and 5. Lever 536 carries a roller 540 engaged by a cam 424 driven by a shaft 101. When the high land of cam 424 frees the roller 540 as shown in Fig. 63, a spring 541 surrounding the link 535 and confined under compression between a block 542 attached to a plate 539 and a collar 543 attached to link 535 urges the link upwardly so that feeler 531 can engage the lead $l$. If there is no lead on the work holder at the time the feeler lever 531 approaches it, then the lever 536 will be allowed to move so far as to engage the plunger 544 of a switch SW13 supported by plate 539. If this switch is opened the solenoid S3 will not be energized although other switches in circuit therewith may close. These other switches will be described later with reference to Fig. 105.

Line VIII of Fig. 107 shows in relation to rotation of shaft 101 the operation of cam 424 in applying the feeler to the lead wire when at the punch press.

16

Lead of locator for the welder J

As the work passes from the punch press G in the direction of arrow 549 (Fig. 70) the lead $l$ passes between a bar 550 and rods 551 which brackets 552 secure to the plate 550. When the conveyor stops with a lead located approximately centrally of the welder J, the lead $l$ is located in the position shown in Fig. 70 by movement of locating fingers 553 toward each other. Fingers 553 are provided by levers 554 connected by pins 555 with levers 556 having slots 557 which receive said pins 555 which are guided for horizontal movement by slots 558 provided by bar 550. Bar 550, which is supported on brackets 560 attached to conveyor bar 31, carries pins 561 pivotally supporting rollers 562 against which the bars 554 are urged by springs 563 which connect levers 554 with levers 556 respectively. When levers 556 separate and cause levers 554 to separate, the surfaces 564 of levers 554 are received by rollers 562 so that the fingers 553 drop below the upper edge of the bar 550 to permit movement of the lead $l$ further in the direction of arrow 549 and movement of a succeeding lead into position adjacent the center of the welder J. The levers 556, which are pivotally supported by rods 566, are connected together by link 567 so that the levers 556 approach each other or separate from each other simultaneously. The left lever 566 has an arm 568 connected by link 569 with a lever 570 whose hub is journaled on a rod 571 supported by a bracket 572 attached to channel 4. Lever 570 carries roller 573 engageable with a cam 427 driven by shaft 101. A spring 574 connecting lever 568 with a stud 575 attached to bracket 196a (see also Fig. 6) urges the roller 573 toward the cam 527. When the high land of cam 527 engages roller 573, the levers 556 and the locating fingers 553 are separated; and, when the low land of the cam 427 is adjacent the roller 573, the spring 574 is permitted to move the locators 553 together.

The welder J welds the clip TC to the lead $l$ when the upper electrode $j$ (Fig. 1) moves down and against the portion of the terminal clip TC around the bared end of the lead and forces the clip against a lower electrode (not shown) and when the welding current is on. The operation of welder J is under control by a solenoid S2 (Fig. 105) and by other switches to be described. As will be explained later, unless a switch SW10 remains closed, the energization of solenoid S2 and the application of welding current will not occur during the cycle of the machine. Switch SW10 is under control by a lead feeler which is a duplicate of that shown in Figs. 63 and 64 except that switch SW10 occupies the place of switch SW13 of Fig. 63.

Lines VII and VIII show in relation to rotation of shaft 101 the operation of cams 427 and 425 which respectively control the lead locator and the lead feeler at welder J.

Stud turner and feeler unit for welder M

Referring to Figs. 75 through 87 the stud turner and feeler unit is designated generally by L. Plate 16 which supports welder M supports also tubular pedestal 580 (Figs. 82 and 83) which provides bearings 581 and 582 which receive a tube 583 carrying bearings 584 and 585 upon which a shaft 586 is journaled. Key 583a prevents rotation of a tube 583 while permitting it to move vertically. Upward movement of the tube 583 is resisted by spring 587. Tube 583 supports a frame 590 providing bearings for a shaft 592 connected with a bevel gear 593 meshing with bevel gear 594 attached to the upper end of a shaft 586 whose lower end is connected with a sprocket 588. Shaft 592 is connected with a bevel gear 595 meshing with a bevel gear 596 connected with a shaft 597 (Fig. 85). Shaft 597 is journaled in a bushing 598 retained by sleeve 599 attached to frame 590. Shaft 597 encloses a rod 600 and a plunger 601 attached to the rod and carrying a blade 602 adapted to be received by the slot s' in the head of the stud S (Fig. 86). The shaft 597 rotates the blade 602, the shaft being provided with a slot 603 which receives lug 604 extending from the blade. The rod 583 and the frame 590 are caused to move down so that the sleeve 599 can engage the flange of the stud S and hold it frictionally from rotating while the shaft 597 is rotated to bring the blade 602 into registry with the slot s' of stud S, said blade snapping into the slot by the action of a compression spring 605 confined between the plunger 601 and a plunger 606 provided by shaft 597.

Rotation of the blade 602 is effected by rotation of the shaft 586 which is effected by a mechanism which comprises a cam 430 driven by shaft 101 and engageable with a roller 610 carried by lever 611 whose hub 612 (Fig. 81) carries roller bearings 613, the inner races of which are supported by a rod 614 supported by plates 615 attached to a plate 16. This manner of pivotally supporting lever 611 applies to the pivotal support of other cam operated levers of the machine. Lever 611 is connected by an adjustable link 617, a clevis 618, a pin 619 and a clevis 620 with a chain 621 which passes around the sprocket 586 and is retained in engagement therewith by springs 622 connecting the chain with screws 623 attached to the channel 4. The frame 590 is caused to move up against the action of spring 587 (urging rod 583 down) by the action of a cam 429 driven by shaft 101 and engageable with a roller 630 supported by a lever 631 journaled on a rod 632 supported by plates 633 attached to plate 616 and connected by an adjustable link 634 with a lever 635 pivotally supported by rod 636 carried by bracket 637 attached to channel 5. Lever 635 has a part 638 which engages the lower end of shaft 586. When the low land of cam 429 is adjacent the roller 630 the frame 590 will move down by the action of gravity assisted by spring 639 connecting the tube 583 with lever 635. The action of the cams 429 and 430 is such that, while the frame 590 is down to lower the sleeve 599 into engagement with the flange of stud S as shown in Fig. 86, the cam 430 will permit the lever 611 to be rotated counterclockwise by the action of springs 622 which causes the sprocket 586 to rotate clockwise in order to effect rotation of the blade 602 to such extent that when this rotation ceases the slot s' of stud S will be located so as to receive the left end of the lead l.

The frame 590 supports a stud feeler 640 (Fig. 85) provided by a rod 641 connected by pin 642 with a lever 643 for operating a switch SW5 (Fig. 82). The frame 590 supports a lead feeler 650 provided by rod 651 connected by pin 652 with a lever 653 for operating a switch SW5 (Fig. 84). Levers 643 and 653 are pivotally supported at 644 and 654, respectively, by brackets 645 and 655, respectively, carried by the frame 590. If both the stud and the lead are present the switches SW4 and SW5 will remain closed when the frame 590 is lowered to cause the feelers 640 and 650 to engage the stud and lead respectively. If one of these parts is missing one of the switches will be open and the welder M will not operate at the time following the arrival of that particular work holder after the welder station which is one station ahead of the feeler station as shown in Fig. 79. The wiring to the switches SW4 and SW5 is contained in a conduit 656, the upper end of which is supported by frame 590.

The lines XI and XII of Figs. 107 show, in relation to rotation of the cam 101, the operation of cams 429 and 430 respectively which apply the stud and lead feelers and turn the stud.

Lead bender at the stud turner L

In order to be sure that the left ends of the leads l are bent as shown in Fig. 79 by the time they arrive at the stud turning station there is provided a lever 660 (Fig. 75) attached to a shaft 661 pivotally supported by a bracket 662 and carrying an arm 663 (Fig. 76) adapted to strike stop pin 664 on bracket 662, thus limiting downward movement of the lever 660. In its lowermost position, a hook 665 of lever 660 is engaged by the lead l as the conveyor moves it along in order to bend the left end of the lead away from the stud S so as not to interfere with the application of the blade 602 to the slot s' in the stud. When the frame 590 moves up to separate the feelers and the stud turner from the work, the lever 660 will start to rise just before the frame 590 reaches its topmost position. This is accomplished by providing the frame 590 with a bracket 670 carrying a screw 671 the vertical location of which can be adjusted by nuts 672 and 673 threaded on the screw. The lower end of the screw 671 provides hook 674 for engaging a pin 675 attached to the lever 660. As shown by line XI (Fig. 107) the frame 590 starts to lower before the conveyor stops so that the lever 660 will present its hook 665 to the lead l in time to pull it away from the stud S before the conveyor comes to rest, and the frame 590 is at its uppermost position when the conveyor starts to move thereby raising the hook 665 from the path of movement of the lead.

Lead locator for welder M

Welder M (Figs. 76 and 77) has a lower electrode 680 which is engaged by the lower surface of the stud holder 40 made of copper when it arrives at the station where welder M operates. Under electrode 681 of welder M is caused at the proper time to engage the stud S to force it against the holder 40 and the latter against the electrode 680. The application of welding current under control by means to be described causes the lead l to be welded to the head of the stud S. Before the electrode 681 moves it is necessary that the lead l be located in the slot s' in the head of the stud S. For this purpose a locator is provided. The conveyor rib 31 (Fig. 88) supports a bracket 682 which supports for vertical movement a finger slide 683 connected by a link 684 with a lever 685 pivoted at 686 on a bracket 687 carried by a plate 688 attached to channels 4 and 5. Lever 685 carries a roller 689 engageable with a cam 432 driven by shaft 101. Spring 690 urges the lever 685 clockwise.

The slide 683 supports a bar 691 supporting a plate 692. The slide and the plate support shafts 693 and 694 which are geared together by gears 695 and 696 and which carry, respectively, locating fingers 697 and 698. Shaft 693 is connected with a lever 693a which is connected by link 699 with a level 700 pivotally supported at 701 by bracket 702 supported by plate 688. Lever 700 carries a roller 703 for engaging a cam 431 driven by shaft 101. A spring 704 surrounding a link 699 and located between a collar 705 on plate 688 and a collar 706 on link 699 urges the lever 700 counterclockwise. As shown by lines XIII and XIV of Fig. 107 which represent the operations of cams 431 and 432 respectively, the fingers 697 and 698 grasp the wire lead $l$ and the fingers are lowered by the slide in order to place the lead in the notch $s'$ of the stud S. Following such operation, the welder M is caused to weld the lead $l$ to the stud S and then the welder electrodes separate and the cams return the locating device to its normal status.

While the lead $l$ is moving between the stud turning and feeler station where the unit L operates and the station where welder M operates, lead $l$ is held down by a guard 708 (Fig. 75) integral with a bracket 709 attached to rib 31.

The unloader P

Referring to Figs. 90 to 94 there is a plate 710 supported by the channels 4 and 5 which supports a bracket 711 pivotally supporting at 712 a lever 713 carrying a roller 714 for engaging a cam 433 driven by shaft 101. Lever 713 is connected by a link 715 with a lever 716 pivoted on a rod 717 supported by a bracket 718 having a base 719 which screws 720 clamp against a post 721 in the desired position of vertical adjustment, said screws passing through slots 722 of said post. Post 721 is supported by plate 710. Bracket 718 supports a rod 724 upon which there is journaled a sleeve 725 which provides the hub for two flat levers 726 and 727. A spring 728 connects a stud 729 of lever 726 with a stud 730 supported by plate 710. Spring 728 urges levers 726 and 727 clockwise, said movement being limited by engagement of an ear 731 of lever 727 with a screw 732 adjustably secured to a lug 733 provided by bracket 718. When a work holder travelling on the lower run of the conveyor in the direction of arrow 735 of Fig. 91 arrives near the unloader P, lead $l$ engages fingers provided by the levers 726 and 727 and drags these fingers along with it as the conveyor moves thereby moving the levers counterclockwise and stretching the spring 728. At this time the cam 433 so operates as to cause the lever 716 to move into the position shown in Fig. 92 causing it to engage the hook 41a of the spring clip 41 thereby causing its loop 41b to move away from the lead $l$ whereupon the spring 728 operates to move the levers 726 and 727 quickly clockwise thereby tending to pull the assembled work down from the work holder. Just at this time the descent of the stud S from the stud work holder 40 is assisted by the device shown in Figs. 93 and 94. An air nozzle 740, supported by lever 741 and connected with air hose 742, is caused to descend upon the stud holder 40 and an air valve is opened, thereby causing the stud to be blown out of the work holder. Lever 741 is connected with a lever 741a pivotally supported upon a rod 741b attached to a channel 4 or 5. Lever 741a is connected by a link 743 with a lever 744 pivotally supported at 745 by a bracket 746 supported by plate 710. Lever 744 carries a roller 746 for engaging a cam 749 driven by shaft 101. The cam is so timed that the nozzle 740 is lowered upon the work holder while the conveyor is at rest and just before the clip 41 is turned into the position shown in Fig. 92.

The valve 750 (Figs. 95 and 96) which controls the flow of compressed air into the hose 742 has a plunger 751 which is normally down to close the valve. The plunger is lifted by a rod 752 which is movable through plate 710 and a bracket 753 supported thereby and supporting the air valve. Rod 752 is connected with a lever 754 pivotally supported upon a stud 755 attached to a bracket 755a. Lever 754 carries a roller 756 for engaging a cam 437 operated by shaft 101.

The line XIX of Fig. 107 shows that the air nozzle is lowered upon the stud holder 40, and line XX shows the air valve opens while the nozzle is down, and line XVIII shows that meanwhile the cam 433 has operated to free the lead retaining clip 41.

Safety switch for welder M

Each time the conveyor indexes, shaft 189 (Fig. 99) turns 60°. In order to make sure that the welder M cannot operate during indexing, shaft 189 drives a disc 760 having six equidistant notches 761 each adapted to receive roller 762 carried by lever 763 pivoted at 764 on a bracket 765 which supports a switch SW23 which is normally closed and will be closed when indexing stops, and a spring 767 urges the lever 763 clockwise to cause its roller 762 to engage a notch 761 in disc 760. During indexing when the roller 762 is engaging the outer periphery of the disc 760 the lever 763 will be pushed down to engage the plunger 766 of switch SW23 thereby opening this switch and it will remain open until indexing stops.

Other cam controlled switches

Fig. 100 shows a cam 436 operated by cam shaft 101 and engageable by a roller 770 on a lever 771 pivoted at 772 on a bracket 773 supported by a plate 539a which is supported by the channels 4 and 5. A spring 774 urges the lever 771 toward the cam. When the long dwell of the cam is engaged by roller 770 so that the lever 771 is practically vertical, a switch SW7 is in normally closed position and the switch SW6 is in normally open positon. When the low land 436a of the cam is engaged by the roller 770 the normally closed switch SW7 is opened while switch SW6 remains open. When the high lobe 436b of the cam engages the roller 770, the normally closed switch SW7 remains closed and the normally opened switch SW6 is closed. The timing of the operations of these switches is shown by line XV of Fig. 107.

Fig. 101 shows a cam 426 operated by shaft 101 and engageable with a roller 780 carried by lever 781 pivoted at 782 on a bracket 783 attached to plate 539 supported by channels 4 and 5. A spring 784 urges the lever 781 toward the cam. When the long dwell of the cam is engaged by roller 780 so that the lever 781 is substantially vertical, normally open switches SW12 and SW20 are open. When the low land 426a of the cam engages the roller 780, the normally open switch SW12 is closed and the normally open switch SW20 remains open. When the high lobe 426b of the cam engages the roller 780, the normally open switch SW20 is closed while the normally open switch SW12 remains open. The timing of switches SW12 and SW20 is shown by line IX of Fig. 107.

Fig. 102 shows a cam 428 driven by shaft 101 and engageable with a roller 790 carried by a lever 791 pivoted at 792 on a bracket 793 attached to plate 688 (see also Fig. 89). A spring 794 urges the lever 791 toward cam 428. When the long dwell of this cam engages roller 790, the lever 791 stands practically vertical and two normally open switches SW2 and SW9 are open. When the lobe 426a of the cam engages the lever 790 the two normally opened switches SW2 and SW9 are closed. The timing of these switches is shown by line X of Fig. 107.

Fig. 103 shows a cam WC1 operated by the cam shaft WCS of welder M. Cam WC1 is engaged by roller 800 carried by a lever 801 pivoted at 802 on a bracket 803 carried by a plate 804. A spring 805 urges the lever 801 toward the cam WC1. When the long dwell of the cam engages the roller 800 a normally closed switch SW1 is held open. When the low land WC1a of the cam engages the roller 800 the switch SW1 closes. The timing of switch SW1 is shown by line XVI of Fig. 107.

Fig. 104 shows a cam WC2 driven by the cam shaft WCS of welder M. Cam WC2 engages the roller 810 carried by a lever 811 pivotally supported at 812 on a bracket 813 carried by plate 804. Spring 814 urges the lever 811 toward cam WC2. When the long dwell of the cam WC2 engages the roller 810 normally open switch SW22 is closed and normally closed switch SW3 is open. While the low land WC2a of the cam is engaged by the roller 810, switch SW22 is open and switch SW3 is closed.

In Fig. 105, wires 901, 902 and 903 are connected with a three-phase A. C. source at 220 volts and with manually operated switches SW14, SW16, SW17, SW18, SW21, SW15 and SW19. Switch SW15 is connected with welder J and its controlling apparatus. Welder J can be a Taylor-Winfield 20 kv.-a. welder. It is controlled by a solenoid S2 which operates an air valve which controls the passage of compressed air to a cylinder j'' in which there is a piston j' connected to the upper electrode j. When solenoid S2 is energized the electrode j moves down to engage the terminal clip and press it against a stationary electrode. Welder J is controlled by unit ST which can be a General Electric model CR7503 F17842 sequence timer having the terminals indicated within the dot-dash rectangle marked ST. Welder J is controlled by unit IC2 which can be a General Electric model CR7503 E114A2 ignitron contactor having the terminals indicated within the dot-dash rectangle marked IC2. Welder J is controlled by a unit HC which can be a General Electric model CR7503 D137G2 heat control having the terminals indicated within the dot-dash rectangle marked HC. Heat control unit HC is controlled by manually operated switch SW27. The operation of welder J is under control by manually operated switch SW11 in series with feeler switch SW10.

Switches SW16, SW17 and SW18 control, respectively, stud hopper feed operating motor M2, punch press operating motor M3 and conveyor operating motor M4. Punch press clutch control solenoid S3 is under control by switch SW17.

Switch SW15 controls welder M and its operating and controlling devices. Welder M can be a National 50 kv.-a. welder. Switch SW19 separately controls motor M1 of welder M. The mechanical connection between motor M1 and welder cam shaft WCS is effected by a clutch controlled by a solenoid S1. Welder M is controlled by a unit WT which can be a General Electric model CR7503 F116G2 weld timer having the terminals indicated within the dot-dash rectangle marked WT. Welder M is controlled by a unit IC1 which can be a General Electric model CR7503 E108G9 ignitron contactor having the terminals indicated within the dot-dash rectangle marked IC1. Unit IC1 is controlled by a manually operated switch SW8.

As stated before, the punch press G is under control by a solenoid S3 which is under control by the feeler switch SW13.

Switch SW21 connects wires 901 and 902 with the primary winding p' of a transformer TR1 whose secondary winding s1 supplies current at 110 volts through wires 923 and 924 to a control circuit which can best be explained with reference to Fig. 106. The control for welder M comprises initiating circuits I, II and IIa, feeler and remembering circuits III, IIIa and IIIb and a nonbeat safety circuit IV. Circuits V and VI respectively control welder J and punch press G.

Circuit I comprises normally open switch SW2 operated by cam 428, normally closed switch SW23 opened during indexing by the notched disc 769 and the magnet coil of relay R3.

Circuit II comprises normally open contacts r1, r2 and r3 of relays R1, R2 and R3, respectively, and solenoid S1 which controls the welder clutch and solenoid S4 which operates a work counter. Circuit IIa parallelling r1, r2 and r3 includes normally closed switch SW1 held open by cam WC1 except at the time indicated by line XVI of Fig. 107.

Circuit III comprises normally closed feeler switches SW4 and SW5, switch SW6 controlled by cam 436, magnet coil of relay R1 and switch SW7, controlled by cam 436. Circuits IIIa and IIIb which parallel switches SW4, SW5 and SW6 include respectively contacts r1' of relay R1 and a normally open push button switch PB2.

Circuit IV comprises switch SW20 controlled by cam 426, switch SW22 controlled by cam WC2 and the magnet coil of relay R2. Contacts r2' which engage when coil R2 is energized, by-pass the switch SW20.

Circuit V comprises switch SW9 controlled by cam 428, feeler switch SW10 controlled by cam 425, manually closed safety switch SW11 and the magnet coil of relay R4.

Circuit VI comprises normally open switch SW12 controlled by cam 426, feeler switch SW13 controlled by cam 424 and the magnet coil of relay R5.

*Sequence for welder M*

The feeler L (for the stud and lead) is located one conveyor position ahead of the welding station of welder M. If both stud and lead are in position, switches SW4 and SW5 will not be moved so that, when switch SW6 is closed during the latter part of the cycle (see line XV of Fig. 107), the magnet coil of relay R1 will be energized. One set of contacts r1 of relay R1 maintains energization while the other set connects the wires 923 and 928. Now switch SW6 (since it is held closed only momentarily) opens but relay R1 remains energized through its contacts r1'. If either the stud S or the lead l is missing relay R1 will not be energized. The conveyor now starts to index. Switch SW20 is closed by its sequencing cam 426 (see line IX of Fig. 107) and the magnet coil of relay R2 is energized through normally closed switch SW22. Although switch SW20 is closed momentarily, coil R2 remains energized through contacts r2' until switch SW22 opens.

When indexing of the conveyor has been completed switch SW23 drops into its normally closed position, indicating that the stations are in the proper position. Switch SW2 is then closed (see line X of Fig. 107) to energize the magnet coil of relay R3. If some mechanical connections failed to function properly and the conveyor did not index the work holders into their proper positions, switch SW23 would not be closed and relay R3 would not be energized.

Now that relays R1, R2 and R3 are all closed, welder clutch operating solenoid S1 causes the welder clutch to connect the welder motor M1 with the drive shaft WCS and the welding head comes down. Cams WC1, WC2 turn with the welder drive shaft WCS. During one complete revolution of the drive shaft WCS, the welding electrodes advance to the work, remain in contact with the work while the weld is being made and then separate from the work. As the upper electrode starts down, cam WC1 permits switch SW1 to close (see line XVI of Fig. 107) which then by-passes relays R1, R2 and R3. Now these three relays can become deenergized without causing the clutch of welder M to be disengaged because solenoid S1 remains energized. Cam WC2 then opens switch SW22 (see line XVII of Fig. 107) to deenergize coil R2 and the sequencing cam 428 (see line X of Fig. 107) allows switch SW2 to open in order to deenergize relay R3, and sequencing cam 436 (see line XV of Fig. 107) opens switch SW7 to deenergize relay R1.

When both electrodes of welder M are in contact with the work, cam WC2 closes switch SW3 (see line XVII of Fig. 107) to start the operation of the weld period timer WT (Fig. 105). The timer WT in turn causes the ignitron contactor IC1 to pass current to the primary of the transformer 50 kv.-a. of welder M. The ignitron contactor IC1 ceases conducting after the weld period timer WT has timed out.

The drive shaft WCS of the welder M has been turning during welding and now raises the top electrode. As it nears the top of its stroke, cam WC1 allows switch SW1 to open (see line XVI of Fig. 107). The solenoid S1 is deenergized and the welder clutch opens and shaft WCS stops.

At some time after relay R1 opens contact but before the weld is completed, the feelers of unit L come down and the sequencing cam 436 again closes switch SW6 momentarily (see line XV of Fig. 107). If switches SW4 and SW5 are not opened, relay R1 will be energized and will remain energized until after the next indexing operation, thus remembering that both the stud and lead were in position at the station just ahead of the welding station of welder M. Therefore relay R1 is called the remembering relay. If the machine is shut down and the power switches opened after the feelers have operated but before the weld is made, the remembering relay R1 would be deenergized. On starting again, relay R1 would not be energized again until after the next work holder had moved into the station at feeler unit L. Therefore one weld would be missed. Switch PB2 is provided so that the operator can manually reset relay R1 if the work holder at the station of unit L is loaded at the time that the machine is started.

Referring to Fig. 105, switch SW8 is the safety switch, manually operated, which when opened, allows the welder to sequence but does not allow welding current to flow. The non-beat circuit IV of relay R2 is provided to take care of the time during adjustment of the machine when the sequencing cam 428 might be stopped while holding switch SW2 closed. In this case, with remembering relay R1 energized and relay R3 held energized by cam 428, if it were not for the control of relay R2 by the switch SW22, which opens as soon as cam WC2 starts to move, the welder clutch would remain engaged and the welder M would continue to repeat.

To summarize, relay R1 is the remembering relay, relay R2 is the non-beat or non-repeat relay and relay R3 is the conveyor-safety relay.

*Sequence for welder J*

When it is desired to weld switch SW11 is closed manually. When opened, it allows other parts of the assembling machine to be operated without this welder. The feeler 531 (Fig. 63) rotates clockwise just after the conveyor has indexed to move the work to the first welding station. If the wire l is in position, SW10 is not opened. A sequencing cam 428 closes switch SW9, after the feeler is down, to energize relay R4. Relay R4 starts the timer ST which locks itself into operative status. Switch SW9 is then released, relay R4 is deenergized and the feeler 531 rotates counterclockwise.

When the timer ST is started, the air valve operating solenoid S2 is energized and the upper welding electrode j descends upon the work. After the squeeze period section of timer ST times out, the ignitron contactor IC2 becomes conducting and welding current starts to flow. Next, the weld period section of timer ST times out and the ignitron contactor IC2 ceases to be conducting and the weld is finished but is still hot. After the hold period section of the timer ST times out, the air valve solenoid S2 is deenergized and the welding points are separated.

Switch SW21 in the ignition circuit is the manual safety-switch. When open, the welder will sequence mechanically but no welding current will pass.

The heat control HC is a standard phase shifting thyratron circuit which allows the amount of welding heat to be conveniently varied. It has no function as to sequencing of the machine.

*Operation of the clip press G*

The clip press motor M3 is started by closing the switch SW17 and runs continuously. The press crank shaft is driven through single turn clutch tripped by the solenoid S3. A sequencing cam 426 closes switch SW12, after the conveyor has indexed, to energize relay R5 through feeler switch SW13. Each time relay R5 is energized, it energizes solenoid S3 to trip the press. Should the wire be missing, the feeler mechanism comes down and opens switch SW13 so that relay R5 cannot be energized.

While the embodiment of the present invention as herein disclosed, constitutes a preferred form, it is to be understood that other forms might be adopted, all coming within the scope of the claims which follow.

What is claimed is as follows:

1. A machine for making a connector assembly comprising a conveyor, a plurality of work holders moved by the conveyor and each having a stud support and a wire support, means for intermittently moving the conveyor so as to locate the work holders successively at a stud turning station and at a welding station, a frame at the first station mounted for movement toward and away from the conveyor, a blade rotatably supported by the frame and adapted to engage a slot in one end of the stud, means for advancing and retracting the frame, means for rotating the blade so as to locate the slot in position for receiving the wire, means for placing the wire in the slot, a welder at the welding station, means for controlling the welder and mechanism for operating said means in timed relation.

2. A machine for making a connector assembly comprising a conveyor, a plurality of work holders moved by the conveyor and each having a stud support and a wire support, means for intermittently moving the conveyor so as to locate the work holders successively at a stud turning station and at a welding station, a frame at the first station mounted for movement toward and away from the conveyor, a blade rotatably supported by the frame and adapted to engage a slot in one end of the stud, means for advancing and retracting the frame, means for rotating the blade so as to locate the slot in position for receiving the wire, feelers supported by the frame for engaging the stud and wire, devices actuated by the feelers and conditioned for effecting welder operation if the stud and the wire are present, means for placing the wire in the slot, a welder at the welding station, means under control by said devices for controlling the welder and mechanism for operating said means in timed relation.

3. A machine for making a connector assembly comprising a conveyor, a plurality of work holders moved by the conveyor and each having a stud support and a wire support, means for intermittently moving the conveyor so as to locate the work holders successively at a stud turning station and at a welding station, means at the first station for turning the stud so as to locate a slot in one end of the stud for reception of the wire, a pair of wire grasping fingers, a frame upon which the fingers are supported for movement toward the wire, means for moving the fingers to cause them to engage the wire, means for moving the frame to cause the fingers to place the wire in the slot of the stud, a welder at the welding station and mechanism for operating said means in timed relation.

4. A machine for making connector assemblies comprising a conveyor, a plurality of work holders moved by the conveyor and each having a stud support of metal of good electrical conductivity and having a recess for receiving a wire to be united by welding with a stud placed in the support, means for intermittently moving the conveyor to position the work holders successively at a welding station, a welder at the welding station having a fixed electrode into contact with which the stud holder is moved by the conveyor and an electrode movable into engagement with the wire to be joined to the stud and to press the same against the stud, means for controlling the welder and mechanism for operating said conveyor moving means and the welder controlling means in timed relation.

5. A machine for making an assembly of two work pieces and comprising a conveyor, a plurality of work holders moved by the conveyor and each having workpiece supports by which one piece is supported in position for welding to the other, means for indexing the conveyor to move the holders successively to work piece loading stations, to a feeler station and to a welding station immediately following the feeler station, an electric welder at the welding station having an electrode for contacting one work support when at the welding station and a movable electrode for engaging the work piece located by the other support, welder operating means for effecting a cycle of its operation which includes advancing the movable electrode to one work piece to press it against the other, application of welding current to the electrode, cessation of welding current and retraction of the movable electrode, a source of mechanical power, a cam shaft, means for connecting the power source and cam shaft, means for connecting the power source and indexing means during a portion of a cam shaft revolution, a solenoid for controlling the welder operating means, a current source, means for connecting the solenoid and current source including two switches in series, means operated by the cam shaft for causing closure of one of the switches after indexing is completed, feelers at the feeler station for engaging the work pieces, a mechanism operated by the cam shaft for advancing and retracting the feelers relative to the work pieces, means operated by the cam shaft for the purpose of effecting closure of the other solenoid switch while the work is at the feeler station and for maintaining switch closure until after the work is moved by the conveyor to the welding station, and means rendered operative by feeler movement if a work piece is not present at the feeler station for rendering ineffective the cam shaft operated means last mentioned.

6. A machine according to claim 5 in which the switch, which is caused to be closed after indexing is completed, is a relay switch having a magnet coil, in which two switches in series connect the magnet coil with the current source, in which a cam driven by the cam shaft operates to close one of said switches after indexing ceases and in which a member moving with the conveyor operates to permit spring closure of the other switch provided the conveyor has been indexed the full distance.

7. A machine according to claim 5 in which that switch in series with the solenoid which is under control of the cam shaft and by feeler movement is a relay switch having a magnet coil, in which three normally closed switches and one normally opened switch in series are used to connect the magnet coil with a current source, each of two of said normally closed switches being opened by feeler movement in case of absence of a work piece, in which a cam driven by the cam shaft operates before the next conveyor indexing momentarily to close the normally open switch, whereby the coil is energized, another relay switch closed by energization of the magnet coil to provide a by-pass around only the feeler controlled switches and the normally open switch whereby energization of the relay coil is maintained after the net indexing and closure of the other switch in series with the solenoid, in which a cam driven by the cam shaft operates momentarily to open the other normally closed switch after the welder operating means has started to function and before the normally opened switch is closed whereby the relay coil is deenergized prior to the reenergization control by the cam shaft and the feelers, a switch for by-passing the switches in series with the solenoid, and a cam operated by the welder operating means for closing the by-pass switch during a cycle of operation of the welder.

8. A machine according to claim 5 characterized by the addition of a third switch in series with the two solenoid controlling switches, said third switch being a relay switch having a magnet coil, means for connecting the magnet coil with the current source and including two switches in series, one normally closed and the other normally open, a cam driven by the cam shaft for momentarily closing the normally open switch during indexing operation, another switch closed by energization of the magnet coil for by-passing the normally open switch whereby energization of the magnet coil is maintained after indexing operation, a cam operated by the welder operating means for opening the normally closed switch whereby repeat functioning of the welder operating means is prevented in case the machine should happen to be stopped with closure of that solenoid control switch which closes after indexing is completed, a switch for by-passing the three switches in series with the solenoid, and a cam operated by the welder operating means for closing the by-pass switch during a cycle of operation of the welder.

9. A machine for making a connector assembly comprising a conveyor, a plurality of work holders each having a stud support and a wire support, and moved by the conveyor successively to a wire loading station, a stud loading station and a welding station, means for intermittently moving the conveyor, a hopper feed comprising a hopper for containing studs and a stud chute and a device for causing studs to descend the chute only when in proper position, a gate at the lower end of the chute blocking movement of a stud therefrom, means for causing studs in the chute to descend singly to the gate, means at the second station for opening the gate to release a stud and transferring the released stud to a stud support located at that station, a welder at a third station for welding the wire to the stud, means for controlling the welder, and mechanism for operating said means in timed relation.

10. In a machine for making a connector assembly the combination comprising a conveyor, a plurality of work holders each having a stud support and a wire support, and moved by the conveyor successively to a wire loading station and a stud loading station, means for intermittently moving the conveyor, a hopper feed comprising a hopper for containing studs and a stud chute and a device for permitting studs to descend the chute only when in proper position, a gate at the lower end of the chute blocking movement of a stud therefrom, means for causing studs in the chute to descend singly to the gate, a pair of stud gripping fingers, a carriage for supporting the fingers for movement toward the stud to grip it and away from the stud to release it, means for moving the carriage so as to locate the fingers at the chute gate or at the stud support, means for effecting retraction of the fingers while at the chute gate, means responsive to said retractive movement for opening the gate so that the stud gravitates past the gate, a stop limiting movement of the stud to a position between the fingers, means for advancing the fingers into stud gripping position, and means for effecting retraction of the fingers while the stud carried thereby is positioned above the stud support to cause the stud to gravitate to the support.

11. In a machine for making a connector assembly the combination comprising a conveyor, a plurality of work holders each having a stud support and a wire support, and moved by the conveyor successively to a wire loading station and a stud loading station, means for intermittently moving the conveyor, a hopper feed comprising a hopper for containing studs and a stud chute and a device for permitting studs to descend the chute only when in proper position, a gate at the lower end of the chute blocking movement of a stud therefrom, means for causing studs in the chute to descend singly to the gate, pair of stud gripping fingers, a carriage for supporting the fingers for movement toward the stud to grip it and away from the stud to release it, means for moving the carriage so as to locate the fingers at the chute gate or at the stud support, means for effecting retraction of the fingers while at the chute gate, means responsive to said retractive movement for opening the gate so that the stud gravitates past the gate, a stop limiting movement of the stud to a position between the fingers, spring means for urging the fingers into stud gripping position, means for effecting retraction of the fingers while the stud carried thereby is positioned at the stud support to allow the stud to gravitate to the support, and means for positively seating the stud in the support.

12. In a machine for making a connector assembly the combination comprising a conveyor, a plurality of work holders each having a stud support and a wire support, and moved by the conveyor successively to a wire loading station and a stud loading station, means for intermittently moving the conveyor, a hopper feed comprising a hopper for containing studs and a stud chute and a device for permitting studs to descend the chute only when in proper position, a gate at the lower end of the chute blocking movement of a stud therefrom, means for causing studs in the chute to descend singly to the gate, a pair of gripping fingers, a carriage for supporting the fingers for movement toward the stud to grip it and away from the stud to release it, means for moving the carriage so as to locate the fingers at the chute gate and subsequently over the stud support, means for separating the fingers while at the chute gate, means including a portion of one of the fingers for actuating the gate a certain distance from the chute to permit a stud to gravitate past the gate, a stop to limit the movement of the stud, spring means actuating the fingers into gripping relation with the stud upon retraction of their separating means, a second means for separating the fingers while the stud carried thereby is above the stud support to cause the stud to gravitate into the support, and means for positively moving the stud into the support.

13. In a machine for making a connector assembly the combination comprising a conveyor, a plurality of work holders each having a stud support and a wire support, and moved by the conveyor successively to a wire loading station and a stud loading station, means for intermittently moving the conveyor, a hopper feed comprising a hopper for containing studs and a stud chute and a device for permitting studs to descend the chute only when in proper position, a gate at the lower end of the chute blocking movement of a stud therefrom, means for causing studs in the chute to descend singly to the gate, a pair of levers each provided with an arm and having gripping fingers, a carriage for supporting the levers for pivotal movement toward the stud to permit the fingers to grip it and away from the stud to release it, means for moving the carriage so as to locate the levers at the chute gate and subsequently over the stud support, a first plunger for engaging the arms of the levers for separating the fingers while at the chute gate, means including a portion of one of the levers for actuating the gate a certain distance relative to the chute to permit a stud to gravitate past the gate, a stop to limit the movement of the stud past the gate, spring means actuating the levers toward each other so that the fingers will grip the stud upon movement of the first plunger out of engagement with the arms, a second plunger for engaging the arms of the levers for separating the fingers while the stud carried thereby is in vertical alignment with the stud support to permit the stud to gravitate into the stud support, a rod concentrically supported within the second mentioned plunger in axial alignment with the stud support and means for axially moving the rod to positively seat the stud in said support.

14. A machine for making a connector assembly comprising a conveyor, a plurality of work holders each having a wire support, a clip for retaining the wire thereon and a stud support, said holders being moved by the conveyor successively to a wire loading station, a stud loading station, a welding station and an ejecting station, means for intermittently moving the conveyor, means at the second station for placing studs in the stud supports of the work holders when located at that station, a welder at a third station for welding the wire to the stud, means for controlling the welder, means at the last station for moving the clip into wire-releasing position, means at the last station for applying an air blast to the stud to remove the assembly of stud and wire from the work holder at that station, and mechanism for operating said means in timed relation.

15. In a machine for making a connector assembly the combination comprising a chain conveyor, a plurality of work holders each having a wire support, a clip for retaining the wire transversely on the support and a stud support having a hole, said holders being moved by the conveyor successively to a wire loading station, a stud loading station, an assembling station, and an ejection station, means for intermittently moving the conveyor, means at the third station for attaching the wire to the stud, said work being held on the holder by the clip as the holder travels in reversed position with the conveyor toward the ejection position, a member having a wire engaging surface located in the path of movement of the wire and moved by the wire as the conveyor moves the work up to the ejection station, spring means for opposing movement of said member by the wire, means actuated when the stud is at the ejection position to move the clip from the wire thereby releasing the spring for operation to cause said member to retract the stud and wire assembly from the support, means for directing a blast of air into the hole of the stud support coincidentally with operation of the member by the spring and mechanism for operating said means in timed relation.

16. In a machine for making a connector assembly the combination comprising, a horizontal chain conveyor having an upper run and a lower run; a plurality of work holders moved by the conveyor each having a wire support, a clip for retaining the wire laterally on the support, and a support having an opening receiving a stud, said holders being moved successively to a wire loading station, a stud loading station, and an assembling station on the upper run and to an ejection station on the lower run, means for intermittently moving the conveyor, means at the securing station for attaching the wire to the stud, said work being held on the holder by the clip as the holder travels in inverted position with the conveyor along the lower run thereof toward the ejection position, a pivoted lever having a wire engaging surface located in the path of movement of the wire and moved thereby as the conveyor moves the work holder to the ejection station, spring means for opposing movement of the lever by the wire, means operating when the stud is at the ejection position to disengage the clip from the wire to release the spring means for action to cause the lever to force the stud and wire assembly from the support, means for directing a blast of air into the opening of the stud support coincidentally with operation of the lever by the spring, and mechanism for operating said means in timed relation.

JAMES S. BURGE.
WARREN M. RIDER.
JAMES F. SALATIN.
HILTON J. McKEE.

REFERENCES CITED

The following references are of record in the file of this patent:

UNITED STATES PATENTS

| Number | Name | Date |
| --- | --- | --- |
| 2,007,698 | Tear | July 9, 1935 |
| 2,078,694 | Smith | Apr. 27, 1937 |
| 2,338,002 | Mero | Dec. 28, 1943 |
| 2,414,905 | Seltzer | Jan. 28, 1947 |